(12) United States Patent
Yabui et al.

(10) Patent No.: US 9,001,194 B2
(45) Date of Patent: Apr. 7, 2015

(54) STEREO IMAGE DISPLAY DEVICE THAT IS CAPABLE OF MAKING A STEREO IMAGE RECOGNIZED BASED ON A RIGHT-EYE IMAGE AND A LEFT-EYE IMAGE

(75) Inventors: Tomohiko Yabui, Hakusan (JP); Hideki Kitayama, Hakusan (JP); Akinori Hayashi, Hakusan (JP); Katsuhiko Matsunami, Hakusan (JP); Naoshi Isobe, Hakusan (JP)

(73) Assignee: Eizo Corporation, Hakusan-Shi (JP)

( * ) Notice: Subject to any disclaimer, the term of this patent is extended or adjusted under 35 U.S.C. 154(b) by 563 days.

(21) Appl. No.: 13/319,419

(22) PCT Filed: Mar. 5, 2010

(86) PCT No.: PCT/JP2010/001559

§ 371 (c)(1),
(2), (4) Date: Nov. 8, 2011

(87) PCT Pub. No.: WO2010/131400

PCT Pub. Date: Nov. 18, 2010

(65) Prior Publication Data

US 2012/0050505 A1 Mar. 1, 2012

(30) Foreign Application Priority Data

May 14, 2009 (JP) .................................. 2009-117617
Dec. 1, 2009 (JP) .................................. 2009-273223

(51) Int. Cl.
*H04N 13/04* (2006.01)
*G02B 27/22* (2006.01)
(Continued)

(52) U.S. Cl.
CPC ........ *G03B 35/20* (2013.01); *G09G 2320/0233* (2013.01); *G09G 2360/16* (2013.01);
(Continued)

(58) Field of Classification Search
CPC .............. H04N 13/04; G09G 2340/06; G09G 2320/0233; G09G 2360/16
See application file for complete search history.

(56) References Cited

U.S. PATENT DOCUMENTS

| 6,280,034 B1 * | 8/2001 | Brennesholtz | ................... 353/20 |
| 2004/0223379 A1 | 11/2004 | Tomisawa | ..................... 365/200 |

(Continued)

FOREIGN PATENT DOCUMENTS

| CN | 101014137 A | 8/2007 |
| CN | 101131812 A | 8/2008 |

(Continued)

OTHER PUBLICATIONS

Chinese Office Action mailed on Aug. 22, 2013, issued in corresponding Chinese Patent Application CN201080020259.2.

(Continued)

*Primary Examiner* — Joseph Ustaris
*Assistant Examiner* — Jill Sechser
(74) *Attorney, Agent, or Firm* — Stein IP, LLC

(57) ABSTRACT

A luminance correction computation unit 23 corrects a luminance input signal $L_I$, which is inputted into a first luminance adjustment portion 13, to $L_O$ based on the semi-transparent mirror luminance correction coefficient b, and the luminance correction computation unit 23 corrects a luminance input signal $L_I$, which is inputted into a second luminance adjustment portion 13, to $L_O$ based on the semi-transparent mirror luminance correction coefficient b. As a result, an image of the first image display portion 3, which is reflected by a semi-transparent mirror, and an image of the second image display portion, which is allowed to transmit through the semi-transparent mirror, are corrected in order to cancel a luminance difference according to an optical characteristic of the semi-transparent mirror.

13 Claims, 9 Drawing Sheets

(51) Int. Cl.
  *G03B 35/20* (2006.01)
  *G02B 27/26* (2006.01)
  *G09G 3/00* (2006.01)
  *H04N 13/00* (2006.01)
  *G09G 3/34* (2006.01)
  *G09G 5/02* (2006.01)
  *G09G 5/06* (2006.01)

(52) U.S. Cl.
  CPC ............ *G02B27/2235* (2013.01); *G02B 27/26* (2013.01); *G09G 3/003* (2013.01); *G09G 3/3406* (2013.01); *G09G 5/02* (2013.01); *G09G 5/06* (2013.01); *G09G 2340/06* (2013.01); *H04N 13/0025* (2013.01); *H04N 13/0443* (2013.01)

(56) References Cited

U.S. PATENT DOCUMENTS

| | | | |
|---|---|---|---|
| 2005/0068291 A1* | 3/2005 | Coley et al. | 345/156 |
| 2007/0146266 A1 | 6/2007 | Ysauda et al. | |
| 2007/0159602 A1* | 7/2007 | Fergason | 353/8 |
| 2007/0285774 A1* | 12/2007 | Merrirt et al. | 359/465 |
| 2008/0143756 A1* | 6/2008 | Yamamoto et al. | 345/690 |
| 2008/0180453 A1* | 7/2008 | Fergason et al. | 345/581 |

FOREIGN PATENT DOCUMENTS

| | | |
|---|---|---|
| JP | 9-236880 | 9/1997 |
| JP | 2004-241962 | 8/2004 |
| JP | 2005-128254 | 5/2005 |
| JP | 2005-130360 | 5/2005 |
| JP | 2007-193355 | 8/2007 |

OTHER PUBLICATIONS

International Search Report issued in International Application No. PCT/JP2010/001559 on May 18, 2010.

* cited by examiner

STEREO IMAGE DISPLAY DEVICE THAT IS CAPABLE OF MAKING A STEREO IMAGE RECOGNIZED BASED ON A RIGHT-EYE IMAGE AND A LEFT-EYE IMAGE

CROSS-REFERENCE TO RELATED APPLICATIONS

This application is a National Phase of PCT International Patent Application No. PCT/JP2010/001559, filed Mar. 5, 2010, which claims the benefit of Japanese Patent Application Nos. 2009-117617 and 2009-273223, filed May 14, 2009 and Dec. 1, 2009, respectively, in the Japanese Patent Office, the disclosures of which are incorporated herein by reference.

BACKGROUND OF THE INVENTION

1. Field of the Invention

The present invention relates to a stereo image display device that is capable of making a stereo image recognized based on a right-eye image and a left-eye image, and specially relates to a technique that enables binocular vision through a semi-transparent mirror.

2. Description of the Related Art

Conventionally, a device of the above type may be a stereo image display device, which includes, for example, a first display portion configured to display a first image serving as a left-eye image, a second display portion configured to display a second image serving as a right-eye image, a semi-transparent mirror provided at a corner portion formed between the first display portion and the second display portion, a chromaticity adjusting portion configured to adjust a chromaticity of the first display portion and the second display portion, and a luminance adjusting portion configured to adjust a luminance of the first display portion and the second display portion (for example, see Patent Document 1). The above stereo image display device suppresses the variation of chromaticity and luminance of both of the display portions through the chromaticity adjusting portion and the luminance adjusting portion.

In the above conventional device, although nothing is described about the calibration, an optical sensor is used for the calibration in general. Although different from the above stereo image device, the followings are examples, in which the optical sensor is used for a display device capable of displaying a two dimensional image.

There is a first image display device that includes a calibration optical sensor provided separate from the image display device, and the optical sensor is brought into a tight contact with a liquid crystal display panel to execute the calibration (for example, see Patent Document 2). The device is capable of accurately executing the calibration without the influence of disturbance, such as ambient light.

Also, there is a second image display device, in which a calibration optical sensor is provided to a bezel part of the liquid crystal display panel (for example, see Patent Document 3). The above device is configured such that, the optical sensor is received within the bezel part when the liquid crystal display panel is caused to display the image, and also that the optical sensor is advanced toward the liquid crystal display panel only when the calibration is executed. As a result, when the image is displayed, the optical sensor will not hinder the display, In addition to it, when the calibration is executed, the optical sensor is advanced so that the calibration is quickly executed. Also, the device is capable of accurately executing the calibration without the influence of disturbance, such as ambient light.

In order to execute the calibration for the above conventional stereo image display device, for example, it is assumed that a calibration optical sensor is provided at a viewpoint located between the semi-transparent mirror of the stereo image display device and the observer. It is also assumed that, for example, the calibration optical sensor described in the above Patent Document 2 is provided to each of the display portions.

Patent Document 1: JP-A-2004-241962 (FIG. 1, FIG. 2)
Patent Document 2: JP3751621 (FIG. 1)
Patent Document 3: JP-A-2007-193355 (FIG. 1)

SUMMARY OF THE INVENTION

However, in the case of the conventional examples having the above configuration, the following problems exist.

In the conventional former device, the display portion is separate from the optical sensor, and thereby the device is suffered from the adverse influence of the disturbance, such as the ambient light. As a result, the calibration needs to be executed in a dark room. Thereby, it is inconvenient for the user to execute the calibration, and also the optical sensor needs to be highly sensitive because the distance between the display portion and the optical sensor is long. Therefore, the former device is not practical.

In case of the stereo image display device, the conventional latter device has a practical configuration. However, even when the calibration is executed with the calibration coefficients obtained at each of the first display portion and the second display portion, the chromaticity and luminance between the left-eye image and the right-eye image at the viewpoint become unbalanced due to a reflection characteristic and a transmittance characteristic of the semi-transparent mirror. As a result, even the latter device may cause uncomfortable feeling of the stereo image disadvantageously. Specially, since human eyes are sensitive more to the luminance than the chromaticity, it is important to balance the luminance of the right-eye image and the left-eye image in order to achieve natural binocular vision.

The present invention is made in view of the above situation, and therefore it is an objective of the present invention to provide a stereo image display device that is capable of suppressing uncomfortable feeling of a stereo image, which is caused by a semi-transparent mirror, in consideration of a characteristic of the semi-transparent mirror, and that is capable of providing improved flexibility for calibration environment.

The present invention has the following configuration in order to achieve the above objective.

In other words, in the invention according to claim 1, a stereo image display device capable of displaying a stereo image based on a binocular parallax has a first image display means, a second image display means, a semi-transparent mirror, a semi-transparent mirror luminance correction coefficient storage means, and a luminance correcting means. The first image display means has a first video output portion configured to display one of a right-eye image and a left-eye image based on a video signal, and has a first luminance adjustment portion configured to adjust a luminance of the first video output portion based on a luminance input signal. The second image display means is provided to form a corner portion together with the first image display means. The second image display means has a second video output portion configured to display the other one of the right-eye image and the left-eye image based on a video signal, and has a second luminance adjustment portion configured to adjust a luminance of the second video output portion based on a luminance input signal. The semi-transparent mirror is obliquely provided from the corner portion. The semi-transparent mirror is configured to reflect the image, which is displayed on the first image display means, toward an observer, and is configured to allow the image, which is displayed on the second image display means, to transmit therethrough toward the observer. The semi-transparent mirror luminance correction coefficient storage means stores a semi-transparent mirror luminance correction coefficient that is based on a reflectance ratio and a transmittance ratio of the semi-transparent mirror. The luminance correcting means corrects the luminance input signals, which are inputted into the first luminance adjustment portion and the second luminance adjustment portion, based on the semi-transparent mirror luminance correction coefficient. The luminance correcting means adjusts the luminance input signals to cancel a luminance difference between the image of the first image display means, which is reflected by the semi-transparent mirror, and the image of the second image display means, which is allowed to transmit through the semi-transparent mirror.

[Operation/Effect] According to the invention of claim 1, the image displayed on the first video output portion provided to the first image display means is emitted by the luminance adjusted by the first luminance adjustment portion, and is reflected by the semi-transparent mirror to the observer. Also, the image displayed on the second video output portion provided to the second image display means is emitted by the luminance adjusted by the second luminance adjustment portion, and is allowed to transmit through the semi-transparent mirror toward the observer. In the above state, even when the first luminance adjustment portion and the second luminance adjustment portion have the same luminance, eyes of the observer may have uncomfortable feeling of the binocular vision because the luminance difference may be caused by the reflection characteristic and the transmittance characteristic of the semi-transparent mirror. Thus, the luminance correcting means adjusts to cancel a luminance difference of the image of the first image display means reflected by the semi-transparent mirror and the image of the second image display means that is allowed to transmit through the semi-transparent mirror based on the semi-transparent mirror luminance correction coefficient stored in the semi-transparent mirror luminance correction coefficient storage means. As a result, the image of the first image display means reflected by the semi-transparent mirror and the image of the second image display means that is allowed to transmit through the semi-transparent mirror are corrected such that the luminance difference is cancelled according to the optical characteristic of the semi-transparent mirror, and thereby it is possible to suppress the luminance difference of the stereo image. As a result, it is possible to suppress the uncomfortable feeling of the stereo image caused by the semi-transparent mirror.

Also, during the calibration, since it is not needed to consider the characteristic of the semi-transparent mirror, it is possible to separately execute the calibration of each of the first image display means and the second image display means. As a result, it is possible to execute the calibration in a state, where the calibration optical sensor and the like is brought into a tight contact with or is close to the first image display means and the second image display means, and thereby it is possible to improve the flexibility of the calibration environment.

The semi-transparent mirror luminance correction coefficients stored in the semi-transparent mirror luminance correction coefficient storage means are obtained based on the reflectance ratio and the transmittance ratio of the semi-transparent mirror, which are measured in advance. Also, the semi-transparent mirror luminance correction coefficient is used for calculating a state, where light from the first luminance adjustment portion is reflected by the semi-transparent mirror and where light from the second luminance adjustment portion is allowed to transmit through the semi-transparent mirror, and then the coefficient is used for reducing one luminance according to the other luminance that is to become smaller.

Also, in the invention according to claim 2, a stereo image display device capable of displaying a stereo image based on a binocular parallax has a first image display means, a second image display means, and a semi-transparent mirror. The first image display means has a first video output portion configured to display one of a right-eye image and a left-eye image based on a video signal, and a first luminance adjustment portion configured to adjust a luminance of the first video output portion based on a luminance input signal. The second image display means is provided to form a corner portion together with the first image display means. The second image display means has a second video output portion configured to display the other one of the right-eye image and the left-eye image based on a video signal, and has a second luminance adjustment portion configured to adjust a luminance of the second video output portion based on a luminance input signal. The semi-transparent mirror is obliquely provided from the corner portion. The semi-transparent mirror is configured to reflect the image, which is displayed on the first image display means, toward an observer, and is configured to allow the image, which is displayed on the second image display means, to transmit therethrough toward the observer. The first image display means has a semi-transparent mirror reflected luminance correction coefficient storage means and a luminance correcting means. The semi-transparent mirror reflected luminance correction coefficient storage means stores a semi-transparent mirror luminance correction coefficient, which is set based on a reflectance ratio and a transmittance ratio of the semi-transparent mirror in order to cancel a luminance difference. The luminance correcting means corrects the luminance input signal, which is inputted into the first luminance adjustment portion, based on the semi-transparent mirror luminance correction coefficient. The second image display means has a semi-transparent mirror transmitted luminance correction coefficient storage means and a luminance correcting means. The semi-transparent mirror transmitted luminance correction coefficient storage means stores a semi-transparent mirror luminance correction coefficient, which is set based on the transmittance ratio and the reflectance ratio of the semi-transparent mirror in order to cancel the luminance difference. The luminance correcting means corrects the luminance input signal, which is inputted into the second luminance adjustment portion, based on the semi-transparent mirror luminance correction coefficient.

[Operation/Effect] According to the invention of claim 2, the image displayed on the first video output portion provided to the first image display means is emitted by the luminance, which is adjusted by the first luminance adjustment portion, and is reflected by the semi-transparent mirror toward the observer. Also, the image displayed on the second video output portion provided to the second image display means is emitted by the luminance, which is adjusted by the second luminance adjustment portion, and is allowed to transmit through the semi-transparent mirror toward the observer. In the above state, even when the first luminance adjustment portion and the second luminance adjustment portion have the same luminance, the eyes of the observer may have the luminance difference and have uncomfortable feeling of the binocular vision because of the reflection characteristic and the transmittance characteristic of the semi-transparent mirror. Thus, the luminance correcting means corrects the luminance input signal, which is inputted into the first luminance adjustment portion, based on the semi-transparent mirror luminance correction coefficient stored in the semi-transparent mirror reflected luminance correction coefficient storage means, and the luminance correcting means corrects the luminance input signal, which is inputted into the second luminance adjustment portion, based on the semi-transparent mirror luminance correction coefficient stored in the semi-transparent mirror transmitted luminance correction coefficient storage means. As a result, it is possible to correct the luminance input signals to cancel the luminance difference of the image of the first image display means reflected by the semi-transparent mirror and the image of the second image display means that is allowed to transmit through the semi-transparent mirror according to the optical characteristic of the semi-transparent mirror. Therefore, it is possible to suppress the luminance difference of the stereo image. As a result, it is possible to suppress the uncomfortable feeling of the stereo image caused by the semi-transparent mirror.

Also, during the calibration, since it is not required to consider the characteristic of the semi-transparent mirror, it is possible to separately execute the calibration of each of the first image display means and the second image display means. As a result, it is possible to execute the calibration in a state, where the calibration optical sensor and the like is brought into a tight contact with or is close to the first image display means and the second image display means, and thereby it is possible to improve the flexibility of the calibration environment.

The semi-transparent mirror luminance correction coefficient stored in the semi-transparent mirror reflected luminance correction coefficient storage means and the semi-transparent mirror luminance correction coefficient stored in the semi-transparent mirror transmitted luminance correction coefficient storage means are obtained based on the reflectance ratio and the transmittance ratio of the semi-transparent mirror, which are measured in advance. Also, the semi-transparent mirror luminance correction coefficient is used for calculating a state, where light from the first luminance adjustment portion is reflected by the semi-transparent mirror and where light from the second luminance adjustment portion is allowed to transmit through the semi-transparent mirror, and then the coefficient is used for reducing one luminance according to the other luminance that is to become smaller.

Also, in the present invention, the first image display means further has a user setting storage means for storing a luminance set value, which is set by a user, and the luminance input signal is adjusted based on the luminance set value. The second image display means further has a user setting storage means for storing a luminance set value, which is set by the user, and the luminance input signal is adjusted based on the luminance set value (claim 3). Since there is preference of the observer for luminance, the luminance set by the user, including the observer, for the preference is stored in the user setting storage means as the luminance set value. As a result, since the luminance input signal is adjusted based on the luminance set value, it is possible to effectively use the luminance of the preference of the user, and thereby it is possible for the user, including the observer, to comfortably have the binocular vision.

Also, in the present invention, the first image display means has a semi-transparent mirror reflected chromaticity correction coefficient storage means and a chromaticity correcting means. The semi-transparent mirror reflected chromaticity correction coefficient storage means stores a semi-transparent mirror chromaticity correction coefficient used for correcting, based on the reflectance ratio of the semi-transparent mirror, balance of an RGB value that is unbalanced due to a reflection characteristic of the semi-transparent mirror. The chromaticity correcting means corrects the video signal, which is inputted into the first video output portion, based on the semi-transparent mirror chromaticity correction coefficient. The second image display means further has a semi-transparent mirror transmitted chromaticity correction coefficient storage means and a chromaticity correcting means. The semi-transparent mirror transmitted chromaticity correction coefficient storage means stores a semi-transparent mirror chromaticity correction coefficient used for correcting, based on the transmittance ratio of the semi-transparent mirror, balance of an RGB value that is unbalanced by a transmittance characteristic of the semi-transparent mirror. The chromaticity correcting means corrects the video signal, which is inputted into the second video output portion, based on the semi-transparent mirror chromaticity correction coefficient (claim 4). In general, the reflectance ratio and the transmittance ratio differ for different wavelengths because of the optical characteristic of the semi-transparent mirror. As a result, the images of both cases have different chromaticness because not all elements of the RGB value will equally deteriorate due to the reflection or transmission, even when the image of the same chromaticity is reflected by the semi-transparent mirror or is allowed to transmit through the semi-transparent mirror. Thus, the first image display means corrects the balance of the unbalanced RGB value based on the semi-transparent mirror chromaticity correction coefficient stored in the semi-transparent mirror reflected chromaticity correction coefficient storage means. Also, the second image display means corrects the balance of the unbalanced RGB value based on the semi-transparent mirror chromaticity correction coefficient stored in the semi-transparent mirror transmitted chromaticity correction coefficient storage means. As a result, it is possible to suppress the chromaticity difference between the reflected image and the transmitted image. Thus, it is possible for the observer to observe the stereo image in a state, where the chromaticity difference of the stereo image caused by the semi-transparent mirror is suppressed. Therefore, it is possible to further suppress uncomfortable feeling of the stereo image related to the chromaticity.

Also, in the present invention, the first image display means further has a calibration coefficient storage means for storing a calibration coefficient, which is obtained through calibration, and the chromaticity correcting means of the first image display means corrects the video signal, which is inputted into the first video output portion, based on the calibration coefficient. The second image display means further has a calibration coefficient storage means for storing a calibration coefficient, which is obtained through the calibration, and the chromaticity correcting means of the second image display means corrects the video signal, which is inputted into the second video output portion, based on the calibration coefficient (claim 5). The chromaticity correcting means corrects the video signal, which is inputted into the first video output portion, based on the calibration coefficient stored in the calibration coefficient storage means of the first image display means. Also, the chromaticity correcting means corrects the video signal, which is inputted into the second video output portion based on the calibration coefficient stored in the calibration coefficient storage means of the second image display means. As a result, it is possible to effectively use the result of the calibration executed by the user, and thereby it is possible for the user, including the observer, to comfortably have the binocular vision.

In the above, "calibration coefficient" includes a chromaticity correction value and a gamma correction value.

Also, in the present invention, the first image display means and the second image display means respectively have calibration sensors, which collect the calibration coefficients in a state, where the calibration sensors are respectively brought into tight contact with or are close to the first video output portion and the second video output portion (claim 6). Since each of the first image display means and the second image display means has the calibration sensor, it is possible for the user to easily execute calibration of each of the image display means without having the influence of ambient light.

Also, in the present invention, a common value setting means is preferably provided for setting a value set by the user as the luminance set value of the user setting storage means of the first image display means and also as the luminance set value of the user setting storage means of the second image display means (claim 7). Even when the user adjusts the luminance, the luminance set values of the first image display means and the second image display means are set by the common value setting means to the same value. As a result, the luminance balance of the images displayed on both of the image display means is maintained.

Also, in the present invention, there is preferably provided a synchronous setting means for setting, when one of the luminance set values of the user setting storage means of the first image display means and the user setting storage means of the second image display means is changed by the user, the other one of the luminance set values to an equivalent value, which is equivalent to the one of the luminance set values (claim 8). Even when the user adjusts the luminance of one of the image display means, the synchronous setting means sets the luminance of the other one to the same value. As a result, it is possible to maintain the luminance balance of the images displayed on both of the image display means.

Also, in the present invention, the first image display means further has a user setting color correction coefficient storage means for storing a user color correction coefficient, which is set by the user, and the chromaticity correcting means of the first image display means corrects the video signal, which is inputted into the first video output portion, based on the user color correction coefficient. The second image display means further has a user setting color correction coefficient storage means for storing a user color correction coefficient, which is set by the user, and the chromaticity correcting means of the second image display means corrects the video signal, which is inputted into the second video output portion, based on the user color correction coefficient (claim 9). Since the chromaticity correcting means corrects the video signal based on the user color correction coefficient of the user color correction coefficient storage means, it is possible to reflect the preference of the user on the display color of the image.

Also, in the present invention, a common value setting means is preferably provided for setting a value set by the user as the user color correction coefficient of the user setting color correction coefficient storage means of the first image display means and also as the user color correction coefficient of the user setting color correction coefficient storage means of the second image display means (claim 10). Even when the user adjusts the user color correction coefficient, the common value setting means sets the user color correction coefficients of the first image display means and the second image display means to the same value. As a result, it is possible to maintain the chromaticity balance of the images displayed on both of the image display means.

In the above, "user color correction coefficient" includes a gain adjustment and a contrast setting.

Also, in the present invention, there is preferably provided a synchronous setting means for setting, when one of the user color correction coefficients of the user setting color correction coefficient storage means of the first image display means and the user setting color correction coefficient storage means of the second image display means is changed by the user, the other one of the user color correction coefficients to an equivalent value, which is equivalent to the one of the user color correction coefficients (claim 11). Even when the user adjusts one of the user color correction coefficients, the synchronous setting means sets the other one of the user color correction coefficients to the same value. As a result, it is possible to maintain the chromaticity balance of the images displayed on both of the image display means.

Also, in the invention according to claim 12, a stereo image display device capable of displaying a stereo image based on a binocular parallax has a display device main body and a setting unit. The display device main body has a first image display means, a second image display means, and a semi-transparent mirror. The first image display means has a first video output portion configured to display one of a right-eye image and a left-eye image based on a video signal, and has a first luminance adjustment portion configured to adjust a luminance of the first video output portion based on a luminance input signal. The second image display means is provided to form a corner portion together with the first image display means. The second image display means has a second video output portion configured to display the other one of the right-eye image and the left-eye image based on a video signal. The second image display means has a second luminance adjustment portion configured to adjust a luminance of the second video output portion based on a luminance input signal. The semi-transparent mirror is obliquely provided from the corner portion, and the semi-transparent mirror reflects the image, which is displayed on the first image display means, toward an observer, and the semi-transparent mirror allows the image, which is displayed on the second image display means, to transmit therethrough toward the observer. The first image display means has a luminance correcting means for correcting the luminance input signal, which is inputted into the first luminance adjustment portion, based on a semi-transparent mirror luminance correction coefficient that is set based on a reflectance ratio and a transmittance ratio of the semi-transparent mirror in order to cancel a luminance difference. The second image display means has a luminance correcting means for correcting the luminance input signal, which is inputted into the second luminance adjustment portion, based on a semi-transparent mirror luminance correction coefficient that is set based on the transmittance ratio and the reflectance ratio of the semi-transparent mirror in order to cancel the luminance difference. The setting unit has a semi-transparent mirror reflected luminance correction coefficient storage means and a semi-transparent mirror transmitted luminance correction coefficient storage means. The semi-transparent mirror reflected luminance correction coefficient storage means stores the semi-transparent mirror luminance correction coefficient for the first image display means. The semi-transparent mirror transmitted luminance correction coefficient storage means stores the semi-transparent mirror luminance correction coefficient for the second image display means. The setting unit sets the semi-transparent mirror luminance correction coefficient of the semi-transparent mirror reflected luminance correction coefficient storage means and the semi-transparent mirror luminance correction coefficient of the semi-transparent mirror transmitted luminance correction coefficient storage means in the display device main body.

[Operation/Effect] According to the invention of claim 12, the image displayed on the first video output portion provided to the first image display means of the display device main body is emitted by the luminance, which is adjusted by the first luminance adjustment portion, and is reflected by the semi-transparent mirror toward the observer. Also, the image displayed on the second video output portion provided to the second image display means of the display device main body is emitted by the luminance, which is adjusted by the second luminance adjustment portion, and is allowed to transmit through the semi-transparent mirror toward the observer. In the above state, even when the first luminance adjustment portion and the second luminance adjustment portion have the same luminance, the eyes of the observer may receive the luminance difference and have uncomfortable feeling of the binocular vision because of the reflection characteristic and the transmittance characteristic of the semi-transparent mirror. Thus, the luminance correcting means of the display device main body corrects the luminance input signal, which is inputted into the first luminance adjustment portion, based on the semi-transparent mirror luminance correction coefficient, which is stored in the semi-transparent mirror reflected luminance correction coefficient storage means, and which is set by the setting unit. Also, the luminance correcting means of the display device main body corrects the luminance input signal, which is inputted into the second luminance adjustment portion based on the semi-transparent mirror luminance correction coefficient, which is stored in the semi-transparent mirror transmitted luminance correction coefficient storage means, and which is set by the setting unit. As a result, it is possible to correct the luminance input signals to cancel the luminance difference of the image of the first image display means reflected by the semi-transparent mirror and the image of the second image display means that is allowed to transmit through the semi-transparent mirror according to the optical characteristic of the semi-transparent mirror. Therefore, it is possible to suppress the luminance difference of the stereo image of the display device main body. As a result, it is possible to suppress the uncomfortable feeling of the stereo image caused by the semi-transparent mirror.

Also, during the calibration, since it is not required to consider the characteristic of the semi-transparent mirror, it is possible to separately execute the calibration of each of the first image display means and the second image display means of the display device main body. As a result, since it is possible to execute the calibration in a state, where the calibration optical sensor and the like is brought into a tight contact with or is close to the first image display means and the second image display means of the display device main body, it is possible to improve the flexibility of the calibration environment.

The semi-transparent mirror luminance correction coefficient stored in the semi-transparent mirror reflected luminance correction coefficient storage means of the setting unit and the semi-transparent mirror luminance correction coefficient stored in the semi-transparent mirror transmitted luminance correction coefficient storage means of the setting unit are obtained based on the reflectance ratio and the transmittance ratio of the semi-transparent mirror of the display device main body, which are measured in advance. Also, the semi-transparent mirror luminance correction coefficient is used for calculating a state, where light from the first luminance adjustment portion of the display device main body is reflected by the semi-transparent mirror and where light from the second luminance adjustment portion is allowed to transmit through the semi-transparent mirror, to reduce one luminance according to the other luminance that is to become smaller. Since the above coefficients are stored in the setting unit, it is possible to connect the setting unit with multiple stereo image display devices, and thereby it is possible to set the same coefficient in each of the display device main bodies. As a result, it is possible to easily unify the display states of the multiple stereo image display device. Also, since it is possible to employ the single setting unit to the multiple display device main bodies, it is possible to suppress the cost of the display device main bodies.

Also, in the present invention, preferably in the display device main body, the first image display means further has a user setting storage means for storing a luminance set value, which is set by a user, and the luminance input signal is adjusted based on the luminance set value. The second image display means further has a user setting storage means for storing a luminance set value, which is set by the user, and the luminance input signal is adjusted based on the luminance set value (claim 13). Since there is preference of the observer for luminance, the luminance, which is set by the user, including the observer, based on the user's preference, is stored in the user setting storage means of the display device main body as the luminance set value. As a result, by adjusting the luminance input signal based on the luminance set value, it is possible to reflect the preference of the user on the luminance, and thereby it is possible for the user, including the observer, to comfortably have the binocular vision.

Also, in the present invention, preferably in the display device main body, the first image display means has a chromaticity correcting means for correcting the video signal, which is inputted into the first video output portion, based on a semi-transparent mirror chromaticity correction coefficient used for correcting, based on a reflectance ratio of the semi-transparent mirror, balance of an RGB value that is unbalanced due to a reflection characteristic of the semi-transparent mirror. The second image display means has a chromaticity correcting means for correcting the video signal, which is inputted into the second video output portion, based on a semi-transparent mirror chromaticity correction coefficient used for correcting, based on a transmittance ratio of the semi-transparent mirror, balance of an RGB value that is unbalanced due to a transmittance characteristic of the semi-transparent mirror. The setting unit has a semi-transparent mirror reflected chromaticity correction coefficient storage means and a semi-transparent mirror transmitted chromaticity correction coefficient storage means. The semi-transparent mirror reflected chromaticity correction coefficient storage means prestores the semi-transparent mirror chromaticity correction coefficient of the first image display device, and the semi-transparent mirror transmitted chromaticity correction coefficient storage means prestores the semi-transparent mirror chromaticity correction coefficient of the second image display device. The setting unit sets the semi-transparent mirror chromaticity correction coefficient of the semi-transparent mirror reflected chromaticity correction coefficient storage means and the semi-transparent mirror chromaticity correction coefficient of the semi-transparent mirror transmitted chromaticity correction coefficient storage means in the display device main body according to an aspect. In general, the reflectance ratio and the transmittance ratio differ for different wavelengths because of the optical characteristic of the semi-transparent mirror. As a result, the images of both cases have different chromaticness because not all elements of the RGB value will equally deteriorate due to the reflection or transmission, even when the image of the same chromaticity is reflected by the semi-transparent mirror or is allowed to transmit through the semi-transparent mirror. Thus, the first image display means corrects the balance of the unbalanced RGB value based on the semi-transparent mirror chromaticity correction coefficient, which is stored in the semi-transparent mirror reflected chromaticity correction coefficient storage means, and which is set by the setting unit. Also, the second image display means corrects the balance of the unbalanced RGB value based on the semi-transparent mirror chromaticity correction coefficient, which is stored in the semi-transparent mirror transmitted chromaticity correction coefficient storage means, and which is set by the setting unit. As a result, it is possible to suppress the chromaticity difference between the reflected image and the transmitted image. Thus, it is possible for the observer to observe the stereo image in a state, where the chromaticity difference of the stereo image caused by the semi-transparent mirror is suppressed. Therefore, it is possible to further suppress uncomfortable feeling of the stereo image related to the chromaticity. Also, since these coefficients are stored in the setting unit, it is possible to connect the setting unit with the multiple stereo image display devices, and thereby it is possible to set each of the display device main bodies to the same coefficient. As a result, it is possible to easily unify the display states of the multiple stereo image display devices.

Also, in the present invention, the setting unit has a calibration coefficient storage means for storing a calibration coefficient which is obtained through calibration of the first image display means, a calibration coefficient storage means for storing a calibration coefficient which is obtained through calibration of the second image display means, and a computation means. The computation means computes a mirror calibration correction coefficient based on the calibration coefficient of the first image display means and the semi-transparent mirror chromaticity correction coefficient of the semi-transparent mirror reflected chromaticity correction coefficient storage means, and computes a mirror calibration correction coefficient based on the calibration coefficient of the second image display means and the semi-transparent mirror chromaticity correction coefficient of the semi-transparent mirror transmitted chromaticity correction coefficient storage means. The setting unit sets the mirror calibration correction coefficient of the first image display means and the mirror calibration correction coefficient of the second image display means in the display device main body. In the display device main body, the chromaticity correcting means of the first image display means corrects the video signal, which is inputted into the first video output portion, based on the mirror calibration correction coefficient of the first image display means. The chromaticity correcting means of the second image display means corrects the video signal, which is inputted into the second video output portion, based on the mirror calibration correction coefficient of the second image display means according to an aspect. In the first image display means of the display device main body, chromaticity correcting means corrects the video signal, which is inputted into the first video output portion, based on the mirror calibration correction coefficient obtained by the computation means of the setting unit. Also, in the second image display means of the display device main body, chromaticity correcting means corrects the video signal, which is inputted into the second video output portion, based on the mirror calibration correction coefficient obtained through the computation means of the setting unit. As a result, it is possible to effectively use the result of the calibration executed by the user, and thereby it is possible for the user, including the observer, to comfortably have the binocular vision. Also, since these coefficients are stored in the setting unit, it is possible to connect the setting unit with the multiple stereo image display devices, and thereby it is possible to set each of the display device main bodies to the same coefficient. As a result, it is possible to easily unify the display states of the multiple stereo image display devices.

Also, in the present invention, the first image display means and the second image display means of the display device main body respectively have calibration sensors that are configured to collect the calibration coefficients in a state, where the calibration sensors are brought into tight contact with or are close to the first video output portion and the second video output portion, respectively according to an aspect. Since each of the first image display means and the second image display means of the display device main body has the calibration sensor, it is possible for the user to easily execute the calibration of each image display means without being suffered from the influence of ambient light.

Also, in the present invention, a common value setting means is preferably provided for setting a value set by the user as the luminance set value of the user setting storage means of the first image display means in the display device main body and also as the luminance set value of the user setting storage means of the second image display means in the display device main body according to an aspect. Even when the user adjusts the luminance, the luminance set values of the first image display means and the second image display means are set by the common value setting means to the same value. As a result, the luminance balance of the images displayed on both of the image display means in the display device main body is maintained.

Also, in the present invention, there is preferably provided a synchronous setting means for setting, when one of the luminance set values of the user setting storage means of the first image display means in the display device main body and the user setting storage means of the second image display means in the display device main body is changed by the user, the other one of the luminance set values to an equivalent value, which is equivalent to the one of the luminance set values according to an aspect. Even when the user adjusts the luminance of one of the image display means, the synchronous setting means sets the luminance of the other one to the same value. As a result, it is possible to maintain the luminance balance of the images displayed on both of the image display means in the display device main body.

Also, in the present invention, the first image display means of the display device main body further has a user setting color correction coefficient storage means for storing a user color correction coefficient, which is set by the user, and the chromaticity correcting means of the first image display means corrects the video signal, which is inputted into the first video output portion, based on the user color correction coefficient. The second image display means of the display device main body further has a user setting color correction coefficient storage means for storing a user color correction coefficient, which is set by the user, and the chromaticity correcting means of the second image display means corrects the video signal, which is inputted into the second video output portion, based on the user color correction coefficient according to an aspect. Since the chromaticity correcting means corrects the video signal based on the user color correction coefficient of the user color correction coefficient storage means of the display device main body, it is possible to reflect the preference of the user on the display color of the image.

Also, in the present invention, a common value setting means is preferably provided for setting a value set by the user as a user color correction coefficient of the user setting color correction coefficient storage means of the first image display means in the display device main body and also as a user color correction coefficient of the user setting color correction coefficient storage means of the second image display means in the display device main body according to an aspect. Even when the user adjusts the user color correction coefficient of the display device main body, the common value setting means sets the user color correction coefficients of the first image display means and the second image display means to the same value. As a result, it is possible to maintain the chromaticity balance of the images displayed on both of the image display means.

Also, in the present invention, there is preferably provided a synchronous setting means for setting, when one of the user color correction coefficients of the user setting color correction coefficient storage means of the first image display means in the display device main body and the user setting color correction coefficient storage means of the second image display means in the display device main body is changed by the user, the other one of the user color correction coefficients to an equivalent value, which is equivalent to the one of the user color correction coefficients according to an aspect. Even when the user adjusts one of the user color correction coefficients of the display device main body, the synchronous setting means sets the other user color correction coefficient to the same value. As a result, it is possible to maintain the chromaticity balance of the images displayed on both of the image display means.

Also, in the present invention, the semi-transparent mirror has a polarization rotating layer and a semi-transparent mirror layer, which are stacked upon one another in an order from the first image display means, and the polarization rotating layer is configured to rotate a polarizing direction of linearly polarized light according to an aspect. A polarizing direction of light of the image displayed on the second image display means is rotated by the polarization rotating layer when the light transmits through the semi-transparent mirror. In contrast, light of the image displayed on the first image display means is reflected by the semi-transparent mirror layer of the semi-transparent mirror. Due to the above, it is possible to differentiate the polarizing directions of the images displayed on the first image display means and the second image display means. As a result, it is not required to differentiate the configurations related to the polarization of the first image display means and the second image display means, and thereby it is possible to employ the image display means having the same structure. As a result, it is possible to reduce the cost of the manufacturing cost of the stereo image display device.

Also, in the present invention, the semi-transparent mirror has a linearly polarizing layer between the polarization rotating layer and the semi-transparent mirror layer, and the linearly polarizing layer adjusts the polarizing direction of light that transmits through the polarization rotating layer according to an aspect. Because of the linearly polarizing layer, it is possible to adjust the polarizing direction of the light of the image, which has transmitted through the polarization rotating layer and has the rotated polarizing direction. As a result, it is possible to suppress the rainbow pattern and the change of the display color, which may be caused by dispersion of the wavelength of light.

The present specification also discloses the invention related to "an image correcting method of a stereo image display device" as follows.

(1) There is an image correcting method of a stereo image display device that has a first image display means, a second image display means, and a semi-transparent mirror. The first image display means has a first video output portion, which display a first image based on a video signal, and has a first luminance adjustment portion configured to adjust luminance of the first video output portion based on a luminance input signal. The second image display means is provided to form a corner portion together with the first image display means. The second image display means has a second video output portion configured to display a second image based on a video signal, and has a second luminance adjustment portion configured to adjust luminance of the second video output portion based on a luminance input signal. The semi-transparent mirror is obliquely provided from the corner portion. The semi-transparent mirror reflects the first image displayed on the first image display means toward an observer, and allows the second image displayed on the second image display means to transmit therethrough toward the observer. The image correcting method of the stereo image display device, which is capable of displaying a stereo image based on a binocular parallax of the first image and the second image, includes:

a step for computing a luminance reflectance ratio based on a measured reflectance ratio for each wavelength and a measured luminance for each wavelength of the semi-transparent mirror, and for computing a luminance transmittance ratio based on a measured transmittance ratio for each wavelength and the measured luminance for each wavelength of the semi-transparent mirror;

a step for computing a luminance correction coefficient of a reflection side according to a ratio of a smaller one of the luminance reflectance ratio and the luminance transmittance ratio to the luminance reflectance ratio, and for computing a semi-transparent mirror luminance correction coefficient of a transmittance side according to a ratio of a smaller one of the luminance reflectance ratio and the luminance transmittance ratio to the luminance transmittance ratio;

a storing step for prestoring the semi-transparent mirror luminance correction coefficient of the reflection side in storage means of the first image display means, and for prestoring the semi-transparent mirror luminance correction coefficient of the transmittance side in storage means of the second image display means; and a step for correcting the luminance input signal, which is inputted into the first luminance adjustment portion by causing the first image display means to multiply the luminance input signal by the semi-transparent mirror luminance correction coefficient of the reflection side, and for correcting the luminance input signal, which is inputted into the second luminance adjustment portion, by causing the second image display means to multiply the luminance input signal by the semi-transparent mirror luminance correction coefficient of the transmittance side when the images are displayed.

According to the invention described in the above item (1), it is possible to correct the luminance input signal, which is inputted into the first luminance adjustment portion, in order to cancel a luminance difference of the first image display means and the second image display means by multiplying the luminance input signal of the first luminance adjustment portion by the semi-transparent mirror luminance correction coefficient of the reflection side. Also, it is possible to correct the luminance input signal, which is inputted into the second luminance adjustment portion, in order to cancel the luminance difference of the first image display means and the second image display means by multiplying the luminance input signal of the second luminance adjustment portion by the semi-transparent mirror luminance correction coefficient of the transmittance side. As a result, it is possible to suppress the luminance difference of the stereo image, and thereby it is possible to suppress the uncomfortable feeling of the stereo image caused by the semi-transparent mirror.

Also, during the calibration, since it is not required to consider the characteristic of the semi-transparent mirror, it is possible to separately execute the calibration of each of the first image display means and the second image display means. As a result, it is possible to execute the calibration in a state, where the calibration optical sensor and the like is brought into a tight contact with or is close to the first image display means and the second image display means, and thereby it is possible to improve the flexibility of the calibration environment.

Furthermore, since the correction is executed by using the semi-transparent mirror luminance correction coefficient, which is computed by measuring the optical characteristic of the semi-transparent mirror that is actually used, it is possible to highly accurately adjust the luminance, and thereby it is possible to further suppress uncomfortable feeling of the stereo image.

(2) In the image correcting method of the stereo image display device described in the item (1), the image correcting method of the stereo image display device includes, before the storing step:

a step for computing the reflectance ratio for each color related information based on the measured reflectance ratio for each wavelength of the semi-transparent mirror and measured color related information of the video input signal for each wavelength, and for computing the transmittance ratio for each color related information based on measured transmittance ratio for each wavelength of the semi-transparent mirror and measured color related information of the video input signal for each wavelength; and a step for computing the semi-transparent mirror chromaticity correction coefficient of the reflection side for each color related information based on a ratio of a color related information having the smallest reflectance ratio among all of the color related information to each color related information, and for computing the semi-transparent mirror chromaticity correction coefficient of the transmittance side for each color related information based on a ratio of a color related information having the smallest transmittance ratio among all of the color related information to each color related information, and the image correcting method further includes:

a step for prestoring the semi-transparent mirror chromaticity correction coefficient of the reflection side in the storage means of the first image display means, and for prestoring the semi-transparent mirror chromaticity correction coefficient of the transmittance side in the storage means of the second image display means; and a step for correcting the video input signal, which is inputted into the first video output portion, by causing the first image display means to multiply the video input signal by the semi-transparent mirror chromaticity correction coefficient of the reflection side for each color related information, and for correcting the video input signal, which is inputted into the second video input portion, by causing the second image display means to multiply the video input signal by the semi-transparent mirror chromaticity correction coefficient of the transmittance side when the images are displayed.

According to the invention described in the item (2), in the first image display means, balance of the unbalanced RGB value is corrected by multiplying the video input signal of the first video output portion by the semi-transparent mirror chromaticity correction coefficient of the reflection side. In the second image display means, balance of the unbalanced RGB value is corrected by multiplying the video input signal of the second video output portion by the semi-transparent mirror chromaticity correction coefficient of the transmittance side. As a result, it is possible to suppress the chromaticity difference between the reflected image and the transmitted image. Thus, it is possible for the observer to observe the stereo image in a state, where the chromaticity difference of the stereo image caused by the semi-transparent mirror is suppressed. Therefore, it is possible to further suppress uncomfortable feeling of the stereo image.

Also, since the correction is executed by using the semi-transparent mirror chromaticity correction coefficient that is computed by measuring the optical characteristic of the semi-transparent mirror, which is actually used, it is possible to highly accurately adjust the chromaticity, and thereby it is possible to further suppress the uncomfortable feeling of the stereo image related to the chromaticity.

The color related information includes, for example, an RGB value. Also, since the human vision is sensitive more to tristimulus values (XYZ color system) than the RGB value (RGB color system), the following method may be alternatively executed. The reflectance ratio and the transmittance ratio may be computed for each of the tristimulus values instead of the RGB value as the color related information, and then they are converted into the RGB value. Then, the semi-transparent mirror chromaticity correction coefficient of the reflection side and the semi-transparent mirror chromaticity correction coefficient of the transmittance side may be obtained in the end. Due to the above, it is possible to execute the correction that is more natural to the human vision.

According to the stereo image display device of the present invention, the luminance correcting means corrects the luminance input signal, which is inputted into the first luminance adjustment portion, based on the semi-transparent mirror luminance correction coefficient stored in the semi-transparent mirror reflected luminance correction coefficient storage means, and the luminance correcting means corrects the luminance input signal, which is inputted into the second luminance adjustment portion, based on the semi-transparent mirror luminance correction coefficient stored in the semi-transparent mirror transmitted luminance correction coefficient storage means. As a result, it is possible to correct the image of the first image display means reflected by the semi-transparent mirror and the image of the second image display means that is allowed to transmit through the semi-transparent mirror in order to cancel the luminance difference according to the optical characteristic of the semi-transparent mirror, and thereby it is possible to suppress the luminance difference of the stereo image. As a result, it is possible to suppress the uncomfortable feeling of the stereo image caused by the semi-transparent mirror.

Also, during the calibration, since it is not required to consider the characteristic of the semi-transparent mirror, it is possible to separately execute the calibration of each of the first image display means and the second image display means. As a result, it is possible to execute the calibration in a state, where the calibration optical sensor and the like is brought into a tight contact with or is close to the first image display means and the second image display means, and thereby it is possible to improve the flexibility of the calibration environment.

BRIEF DESCRIPTION OF THE DRAWINGS

These and/or other aspects and advantages of the invention will become apparent and more readily appreciated from the following description of the embodiments, taken in conjunction with the accompanying drawings of which.

Figure 1:
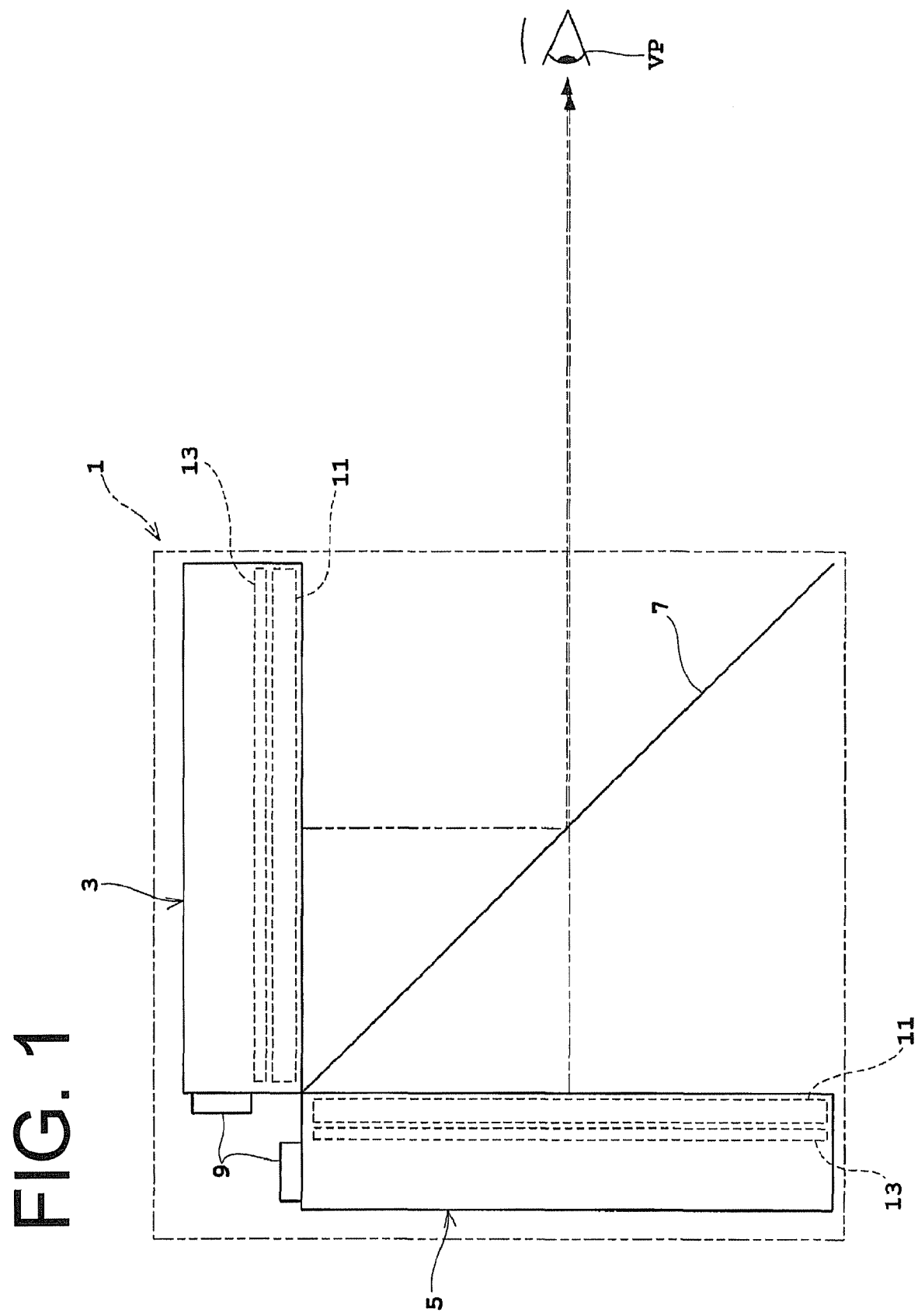
FIG. 1 is a side view illustrating a schematic configuration of a stereo image display device according to an embodiment.

DESCRIPTION OF NUMERALS 1, 1A to 1D . . . stereo image display device
VP . . . viewpoint
3 . . . first image display portion
5 . . . second image display portion
7, 7A . . . semi-transparent mirror
9 . . . video input portion
11 . . . first image output portion, second image output portion
13 . . . first luminance adjustment portion, second luminance adjustment portion
15 . . . computation portion
17 . . . calibration coefficient storage portion
19 . . . semi-transparent mirror correction coefficient storage portion
21 chromaticity correction computation unit
23 . . . luminance correction computation unit
$C_C$ . . . chromaticity correction coefficient
$C_M$ . . . semi-transparent mirror chromaticity correction coefficient
25 . . . user setting storage portion
$L_I$ . . . luminance input signal
b . . . semi-transparent mirror luminance correction coefficient
$L_O$ . . . corrected luminance input signal
31 . . . calibration sensor
33 . . . calibration control unit
51 . . . display device main body
53 . . . setting unit
55 . . . correction coefficient computation unit

DETAILED DESCRIPTION OF THE EMBODIMENTS

One embodiment of the present invention will be described below with reference to accompanying drawings.

Figure 2:
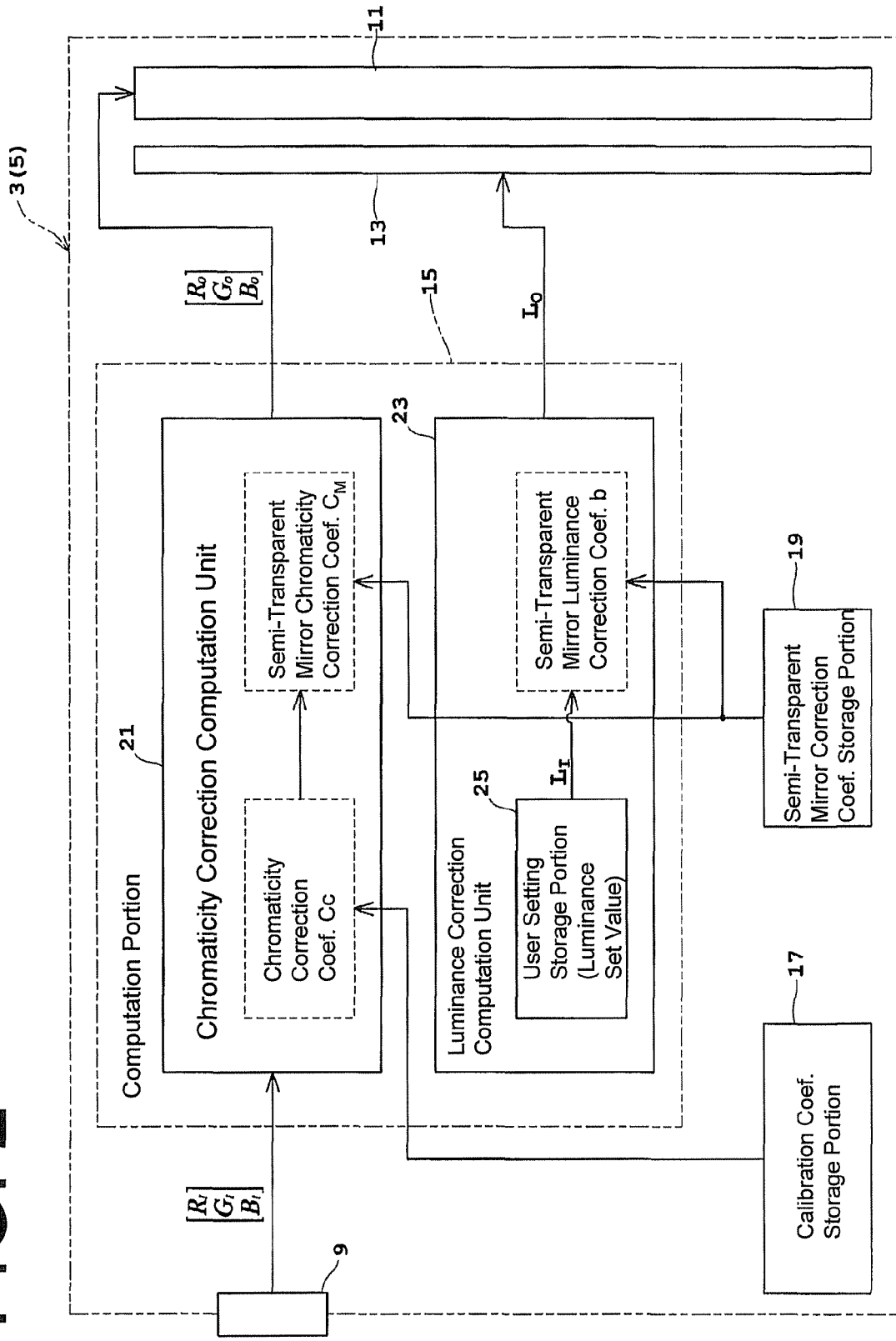
FIG. 2 is a block diagram illustrating a schematic configuration of a first image display portion.

FIG. 1 is a side view illustrating a schematic configuration of a stereo image display device according to the embodiment, and FIG. 2 is a block diagram illustrating a schematic configuration of a first image display portion.

A stereo image display device 1 according to the present embodiment has function of allowing an observer at a viewpoint VP to observe a stereo image based on a binocular parallax.

The stereo image display device 1 includes a first image display portion 3, a second image display portion 5, and a semi-transparent mirror 7. In the embodiment, the first image display portion 3 is provided in a substantially horizontal position with an image screen facing downwardly. The second image display portion 5 is provided in a standing position with an image screen extending in a vertical direction on a back side of the first image display portion 3 when observed from the viewpoint VP. A corner portion is formed at a position, where the first image display portion 3 and the second image display portion 5 are connected with each other. For example, if the first image display portion 3 and the second image display portion 5 have horizontally oriented screens, a depth direction in FIG. 1 corresponds to the longitudinal direction of the display portions. The semi-transparent mirror 7 has a back end attached to the corner portion, and is provided to extend toward the viewpoint VP with the other end thereof provided obliquely and downwardly.

Due to the above configuration, for example, a right-eye image (first image) displayed on the first image display portion 3 is reflected by the semi-transparent mirror 7 toward the viewpoint VP. In contrast, a left-eye image (second image) displayed on the second image display portion 5 transmits through the semi-transparent mirror 7 toward the viewpoint VP.

The first image display portion 3 corresponds to "a first image display means" of the present invention, and the second image display portion 5 corresponds to "a second image display means" of the present invention.

Next, the first image display portion 3 will be described in detail. The explanation will be made with an example of the first image display portion 3 because the first image display portion 3 and the second image display portion 5 are similar in terms of block diagrams except for parameters, which will be described later.

The first image display portion 3 includes a video input portion 9, a first video output portion 11, a first luminance adjustment portion 13, a computation portion 15, a calibration coefficient storage portion 17, and a semi-transparent mirror correction coefficient storage portion 19. The video input portion 9 receives a video signal, which includes a right-eye image among stereo-vision images, from a host (such as a computer). The first video output portion 11 includes, for example, a liquid crystal display panel, and displays the right-eye image based on the video signal. The first luminance adjustment portion 13 includes, for example, a backlight, and adjusts a luminance of the first image output portion 11 based on a luminance input signal. The calibration coefficient storage portion 17 prestores a calibration coefficient, which is obtained through calibration. The calibration coefficient includes a chromaticity correction value and a gamma correction value, and will be described later as a chromaticity correction coefficient $C_C$. The process of the calibration may be executed during the production of the stereo image display device 1, or may be executed by a user of the device 1. Also, the semi-transparent mirror correction coefficient storage portion 19 prestores a semi-transparent mirror luminance correction coefficient b and a semi-transparent mirror chromaticity correction coefficient $C_M$, which will be described later. The semi-transparent mirror luminance correction coefficient b is a reflection-side value based on a reflectance ratio and a transmittance ratio of the semi-transparent mirror 7. The semi-transparent mirror chromaticity correction coefficient $C_M$ is a value based on a reflectance ratio of the semi-transparent mirror 7.

In the above configuration of the first image display portion 3, the calibration coefficient storage portion 17 corresponds to "a calibration coefficient storage means" of the present invention, and the semi-transparent mirror correction coefficient storage portion 19 corresponds to "a semi-transparent mirror reflected luminance correction coefficient storage means", "a semi-transparent mirror luminance correction coefficient storage means", and "a semi-transparent mirror reflected chromaticity correction coefficient storage means" of the present invention.

The computation portion 15 includes a chromaticity correction computation unit 21 and a luminance correction computation unit 23. The chromaticity correction computation unit 21 corrects the video signal, which is received from the video input portion 9, based on the chromaticity correction coefficient $C_C$ and based on the semi-transparent mirror chromaticity correction coefficient $C_M$, and provides the corrected video signal to the first image output portion 11. The luminance correction computation unit 23 has a user setting storage portion 25 that stores a luminance set value, which is preset by the user (for example, observer) based on the user's preference. The luminance correction computation unit 23 corrects a luminance input signal $L_I$ based on the semi-transparent mirror luminance correction coefficient b, which is stored in the semi-transparent mirror correction coefficient storage portion 19, and provides the corrected signal, as a luminance input signal $L_O$, to the first luminance adjustment portion 13.

The chromaticity correction computation unit 21 corresponds to "a chromaticity correcting means" of the present invention, and the luminance correction computation unit 23 corresponds to "a luminance correcting means" of the present invention. Also, the user setting storage portion 25 corresponds to "a user setting storage means" of the present invention.

The second image display portion 5 has a configuration similar to the above first image display portion 5. However, the chromaticity correction coefficient $C_C$ stored in the calibration coefficient storage portion 17 is collected during calibration of the second image display portion 5, and a luminance set value stored in the user setting storage portion 25 is set for the second image display portion 5. Also, the semi-transparent mirror luminance correction coefficient b, which is stored in the semi-transparent mirror correction coefficient storage portion 19, and the semi-transparent mirror chromaticity correction coefficient $C_M$ are set for the second image display portion 5. In other words, the semi-transparent mirror luminance correction coefficient b is a transmittance side value based on the reflectance ratio and the transmittance ratio of the semi-transparent mirror 7, and the semi-transparent mirror chromaticity correction coefficient $C_M$ is a value based on the transmittance ratio of the semi-transparent mirror 7.

In the configuration of the second image display portion 5, the calibration coefficient storage portion 17 corresponds to "a calibration coefficient storage means" of the present invention, and the semi-transparent mirror correction coefficient storage portion 19 corresponds to "a semi-transparent mirror transmitted luminance correction coefficient storage means" and "a semi-transparent mirror transmitted chromaticity correction coefficient storage means" of the present invention.

Figure 3:
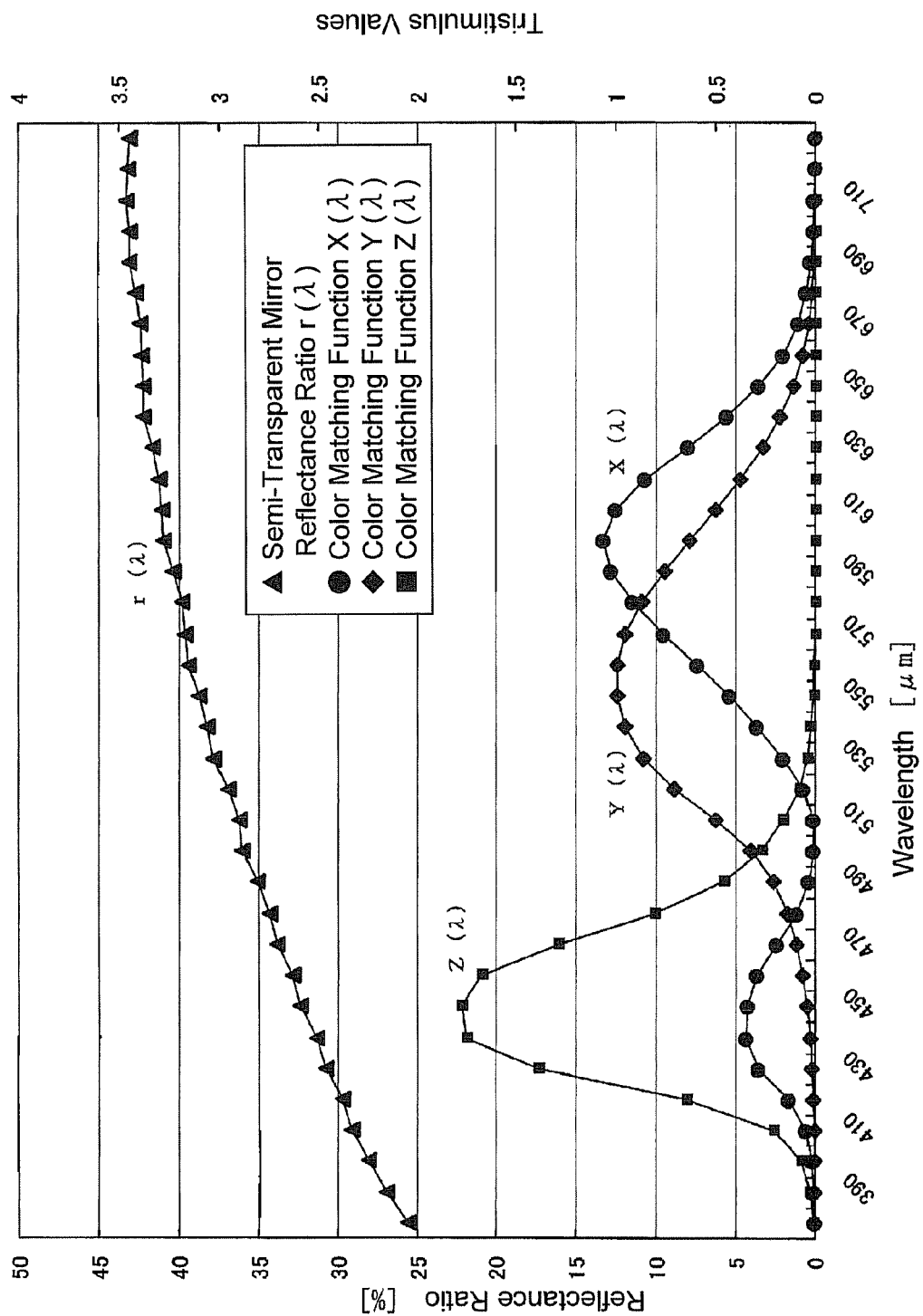
FIG. 3 is a chart indicating a relation between a wavelength and a tristimulus values and indicating another relation between the wavelength and a reflectance ratio.

Next, a method of calculating the semi-transparent mirror chromaticity correction coefficient $C_M$ and the semi-transparent mirror luminance correction coefficient b will be described with reference to FIG. 3. FIG. 3 is a chart illustrating a relation between a wavelength and tristimulus values and illustrating another relation between a wavelength and a reflectance ratio.

<Semi-Transparent Mirror Chromaticity Correction Coefficient $C_M$>

Firstly, the method of calculating the semi-transparent mirror chromaticity correction coefficient $C_M$ will be described.

The video signal (color related information) is inputted from the host through the video input portion 9, and the video signal is assumed to be an RGB value (RGB color system). Tristimulus values, which are invented three primary colors, match the photoreceptor sensitivity of the human eyes more than the RGB value, which represents three primary colors made based on the optical theory, does. Thus, in the present embodiment, the tristimulus values are used to calculate the correction coefficient. The tristimulus values are also referred to as an XYZ color system, and a stimulus value X is red (+blue), a stimulus value Y is a luminance (+green), and a stimulus value Z is blue.

As shown in FIG. 3, firstly, a reflectance ratio $r(\lambda)$ of the gem mirror 7 for each wavelength is measured. The semi-transparent mirror 7 has an optical characteristic, in which a distribution of the reflectance ratio is different for different wavelength. This is also true for the transmittance ratio. Thus, firstly, the distribution of the reflectance ratio for different wavelength for each of the tristimulus values XYZ is considered based on the following equations (1) to (3). A range of the wavelength is set from 380 to 780 [nm] because it is only needed to consider the wavelength range that the human eyes are capable of sensing.

$$r_X = \int_{380}^{780} X(\lambda) r(\lambda) d\lambda \tag{1}$$

$$r_Y = \int_{380}^{780} Y(\lambda) r(\lambda) d\lambda \tag{2}$$

$$r_Z = \int_{380}^{780} Z(\lambda) r(\lambda) d\lambda \tag{3}$$

Next, the correction coefficient for the RGB value, which serves as the video input signal, is calculated based on the reflectance ratio for each wavelength for the above tristimulus values. Firstly, maximum values of the RGB value, which are outputted by the first image output portion 11, are defined as $R_{Max}$, $G_{Max}$, and $B_{Max}$ (for example, the maximum value is 255 for each color level of the RGB value), and the RGB value, which reaches the viewpoint VP through the semi-transparent mirror 7, is defined to include $R'_{Max}$, $G'_{Max}$, and $B'_{Max}$. $R'_{Max}$, $G'_{Max}$, and $B'_{Max}$ are calculated by using the above equations (1) to (3) through the following equation (4). Note that a matrix M is a conversion matrix for converting the RGB color space into the XYZ color space, and $M^{-1}$ is a conversion matrix for converting the XYZ color space into the RGB color space.

$$\begin{bmatrix} R'_{MAX} \\ G'_{MAX} \\ B'_{MAX} \end{bmatrix} = M^{-1} \left( \begin{bmatrix} r_X & 0 & 0 \\ 0 & r_Y & 0 \\ 0 & 0 & r_Z \end{bmatrix} \left( M \begin{bmatrix} R_{MAX} \\ G_{MAX} \\ B_{MAX} \end{bmatrix} \right) \right) \tag{4}$$

By using the above $R'_{Max}$, $G'_{Max}$, and $B'_{Max}$, correction coefficients $c_r$, $c_g$, and $c_b$ in the RGB color space are computed by using the following equations (5) to (7). In the equations, $C_{MIN}$ indicates that $C_{MIN} = \text{MIN}(R'_{Max}, G'_{Max}, B'_{Max})$. The term MIN indicates the function of extracting the minimum value among the values in the bracket.

$$c_r = C_{MIN}/R'_{Max} \tag{5}$$

$$c_g = C_{MIN}/G'_{Max} \tag{6}$$

$$c_b = C_{MIN}/B'_{Max} \tag{7}$$

Each of the above equations (5) to (7) means that one color level of the RGB value is reduced accordingly as another color level is reduced due to the reflectance ratio. In other words, one color level, which has been reduced due to the reflection by a smaller amount, is further reduced according to another color level, which has been reduced more due to the reflection, in order to balance the color.

The following semi-transparent mirror chromaticity correction coefficient $C_M$, which is computed by the following equation (8), is stored in the semi-transparent mirror correction coefficient storage portion 19 shown in FIG. 1.

$$C_M = \begin{bmatrix} c_r & 0 & 0 \\ 0 & c_g & 0 \\ 0 & 0 & c_b \end{bmatrix} \quad (8)$$

The chromaticity correction computation unit 21 executes correction computation based on the following equation (9).

$$\begin{bmatrix} R_O \\ G_O \\ B_O \end{bmatrix} = C_M \left( C_c \begin{bmatrix} R_I \\ G_I \\ B_I \end{bmatrix} \right) \quad (9)$$

$R_I$, $G_I$, and $B_I$ in equation (9) serve as the input video signal, which is inputted into the video input portion 9 of the first image display portion 3, and $R_O$, $G_O$, and $B_O$ serve as the RGB value, which is outputted to the first image display portion 3. Also, a matrix $C_C$ is the chromaticity correction coefficient, which is stored in the calibration coefficient storage portion 17.

The semi-transparent mirror chromaticity correction coefficient $C_M$, which is calculated by the above equation (8), is a value for correcting the influence caused by the reflection by the semi-transparent mirror 7. The value, which is calculated through the above equation (8) by replacing the reflectance ratio with the transmittance ratio during the above calculating process, is a value for correcting the influence caused by the transmittance through the semi-transparent mirror 7.

<Semi-Transparent Mirror Luminance Correction Coefficient b>

Next, a method of calculating the semi-transparent mirror luminance correction coefficient b will be described.

The semi-transparent mirror luminance correction coefficient b for correcting luminance difference between a reflection side and a transmittance side is computed based on a reflectance ratio $r_Y$ (and a transmittance ratio) of the stimulus value Y. The reflectance ratio $r_Y$ (and the transmittance ratio) of the stimulus value Y are obtained in consideration of the wavelength computed during the process of obtaining the semi-transparent mirror chromaticity correction coefficient $C_M$ of the reflection side and the transmittance side. The semi-transparent mirror luminance correction coefficients $b_{REF}$, $b_{TRAN}$ for the reflection side and the transmittance side are defined by the following equations (10) and (11). The reflectance ratio $r_Y$ for the reflection side is defined as $r_Y^{REF}$, and the transmittance ratio $r_Y$ for the transmittance side is defined as $r_Y^{TRAN}$.

$$b_{REF} = r_Y^{MIN}/r_Y^{REF} \quad (10)$$

$$b_{TRAN} = r_Y^{MIN}/r_Y^{TRAN} \quad (11)$$

In the above, $r_Y^{MIN}$ is defined by the following equation (12).

$$r_Y^{MIN} = \text{MIN}(r_Y^{REF}, r_Y^{TRAN}) \quad (12)$$

In the luminance correction computation unit 23 shown in FIG. 1, the computation shown in the following equation (13) is executed. Here, a signal, which has not been corrected, is defined as a luminance input signal $L_I$, and a corrected signal is defined as a luminance input signal $L_O$.

$$L_O = bL_I \quad (13)$$

In the above, the semi-transparent mirror luminance correction coefficient b satisfies $b=b_{REF}$ in case of the reflection side, and is stored in the semi-transparent mirror correction coefficient storage portion 19 of the first image display portion 3. Also, $b=b_{TRAN}$ is satisfied in case of the transmittance side, and is stored in the semi-transparent mirror correction coefficient storage portion 19 of the second image display portion 5. Thus, it is meant that the semi-transparent mirror luminance correction coefficients b are used for reducing the luminance of one of the transmittance side and the reflection side according to the luminance of the other one, which has the luminance reduced due to the transmittance or the reflection.

The reflectance ratio $r_Y^{REF}$ for the reflection side corresponds to "luminance reflectance ratio", and the transmittance ratio $r_Y^{TRAN}$ for the transmittance side corresponds to "luminance transmittance ratio". Also, the semi-transparent mirror luminance correction coefficient $b_{REF}$ corresponds to "semi-transparent mirror luminance correction coefficient of the reflection side", and the luminance correction coefficient $b_{TRAN}$ corresponds to "semi-transparent mirror luminance correction coefficient of the transmittance side".

According to the present embodiment device, the luminance correction computation unit 23 corrects the luminance input signal, which is inputted into the first luminance adjustment portion 13, based on the semi-transparent mirror luminance correction coefficient b, and the luminance correction computation unit 23 corrects the luminance input signal, which is inputted into the second luminance adjustment portion 13, based on the semi-transparent mirror luminance correction coefficient. Therefore, the image of the first image display portion 3, which is reflected by the semi-transparent mirror 7, and the image of the second image display portion 5, which is allowed to transmit through the semi-transparent mirror 7, are respectively corrected to cancel a luminance difference according to the optical characteristic of the semi-transparent mirror 7, and thereby it is possible to suppress the luminance difference of the stereo image. As a result, it is possible to suppress uncomfortable feeling of the stereo image caused by the semi-transparent mirror 7.

Also, since the luminance input signal is adjusted based on the luminance set value of the user setting storage portion 25, it is possible to reflect the luminance of the user's preference on the luminance input signal, and thereby the user, including the observer, is comfortably capable of having the binocular vision.

Furthermore, in the first image display portion 3, the balance of the RGB value, which has become unbalanced due to the reflection, is corrected based on the semi-transparent mirror chromaticity correction coefficient $C_M$, and in the second image display portion 5, the balance of the RGB value, which has become unbalanced due to the transmittance, is corrected based on the semi-transparent mirror chromaticity correction coefficient $C_M$. As a result, it is possible to suppress the difference of the chromaticity between the reflected image and the transmitted image. As a result, the observer is capable of observing the stereo image in a state, where the chromaticity difference of the stereo image caused by the semi-transparent mirror 7 is suppressed. Thereby, it is possible to further suppress the uncomfortable feeling of the stereo image related to the chromaticity.

Also, the chromaticity correction computation unit 21 corrects the video signal based on the calibration coefficient stored in the calibration coefficient storage portion 17. As a result, it is possible to effectively use the result of the calibration executed by the user, and thereby it is possible for the user, including the observer, to more comfortably have the binocular vision.

Also, since it is not needed to consider the characteristic of the semi-transparent mirror 7 during the calibration, it is possible to individually execute the calibration for each of the first image display portion 3 and the second image display portion 5. As a result, since it is possible to execute the calibration in a state, where a calibration optical sensor and the like is brought into tight contact with or is placed close to the first image display portion 3 and the second image display portion 5, it is possible to increase the flexibility of the calibration environment.

<First Modification>

Figure 4:
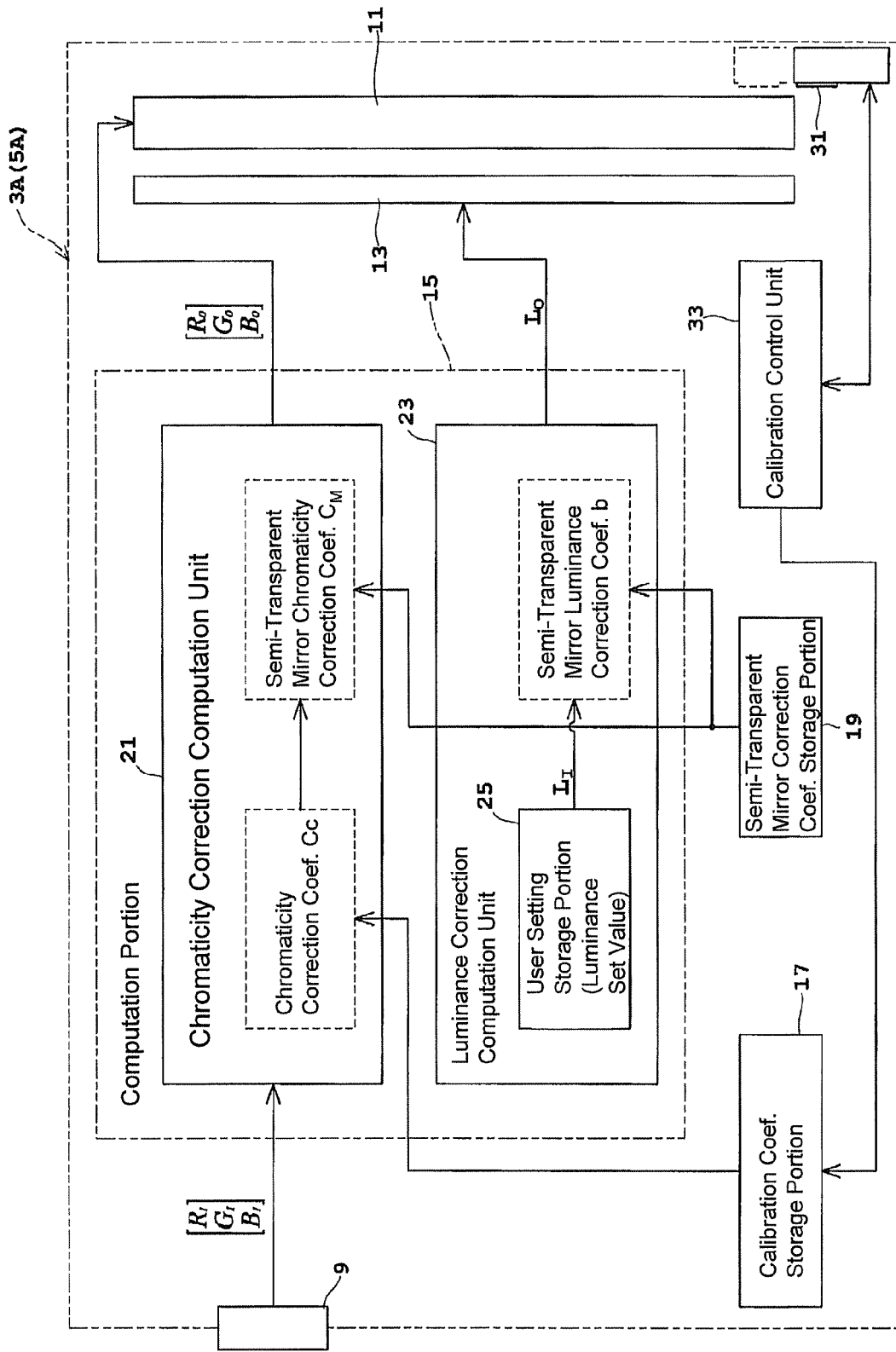
FIG. 4 is a block diagram illustrating a first image display portion according to the first modification.

The above embodiment is not provided with a calibration sensor, and the calibration sensor is assumed to be a separate body. The present invention may employ an integral configuration, which is integral with the calibration sensor. FIG. 4 is referred to for explaining the present modification. FIG. 4 is a block diagram illustrating a first image display portion according to the modification.

A first image display portion 3A internally includes a calibration sensor 31 inside a front bezel of the first image display portion 3. The calibration sensor 31 is controlled by a calibration control unit 33. For example, it is controlled such that the calibration sensor 31 is received within the front bezel in a normal state, and the calibration sensor 31 is advanced from the front bezel only during the execution of the calibration. In the advanced state, a photometric surface of the calibration sensor 31 is placed in tight contact with or is close to the screen of the first image output portion 11. A calibration coefficient, which is collected by the calibration sensor 31, is stored in the calibration coefficient storage portion 17. The above configuration is also provided to a second image display portion 5A.

Due to the above configuration, the user is capable of easily executing the calibration of the first image display portion 3A and the second image display portion 5A without the influence of ambient light.

<Second Modification>

Figure 5:
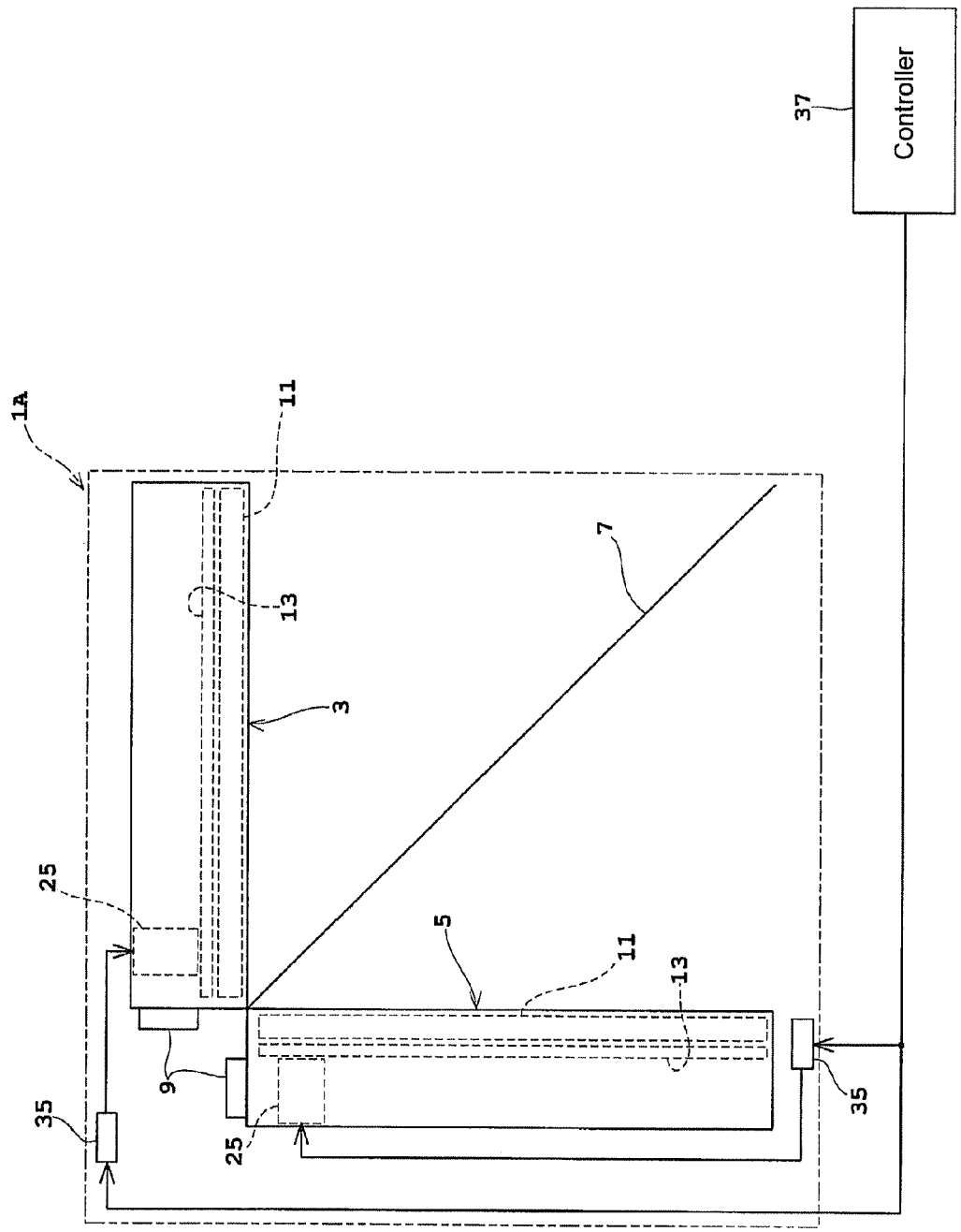
FIG. 5 is a side view illustrating a schematic configuration of a stereo image display device according to the second modification.

In the above embodiment and the first modification, it is preferable to employ the following configuration. FIG. 5 is referred to for explaining the present modification. FIG. 5 is a side view illustrating a schematic configuration of a stereo image display device according to the second modification.

The stereo image display device 1A includes a receiver 35, which is connected to the user setting storage portion 25 of the first image display portion 3, and includes a receiver 35, which is connected to the user setting storage portion 25 of the second image display portion 5. The receivers 35 are connected to a controller 37. The controller 37 has, for example, function of setting a parameter related to the stereo image display device 1A, and function of transmitting the set parameter. Specifically, for example, the controller 37 may be a personal computer connected to the stereo image display device 1A, or may be a switch, which is provided to the first image display portion 3 and the second image display portion 5 for adjusting the image quality.

Each receiver 35 receives a luminance set value transmitted from the controller 37. The luminance set value received by each receiver 35 is written to the user setting storage portion 25, which is connected to the respective receiver 35. The luminance set value, which is transmitted from the controller 37, is a desired luminance value, which is set by the user. In other words, the same luminance set value is written to both of the user setting storage portions 25.

Each receiver 35 and the controller 37 in the above description correspond to "a common value setting means" of the present invention.

According to the configuration of the above stereo image display device 1A, the user-preferred luminance value, which is determined through the controller 37, is set in the first image display portion 3 and in the second image display portion 5. As a result, even in a case, where the user adjusts the luminance to a desired degree, the luminance set values of the first image display portion 3 and the second image display portion 5 are set equivalent to each other. As a result, even when the correction related to the above semi-transparent mirror 7 is executed, the luminance balance of the images displayed on both image display portions 3, 5 is maintained.

<Third Modification>

Figure 6:
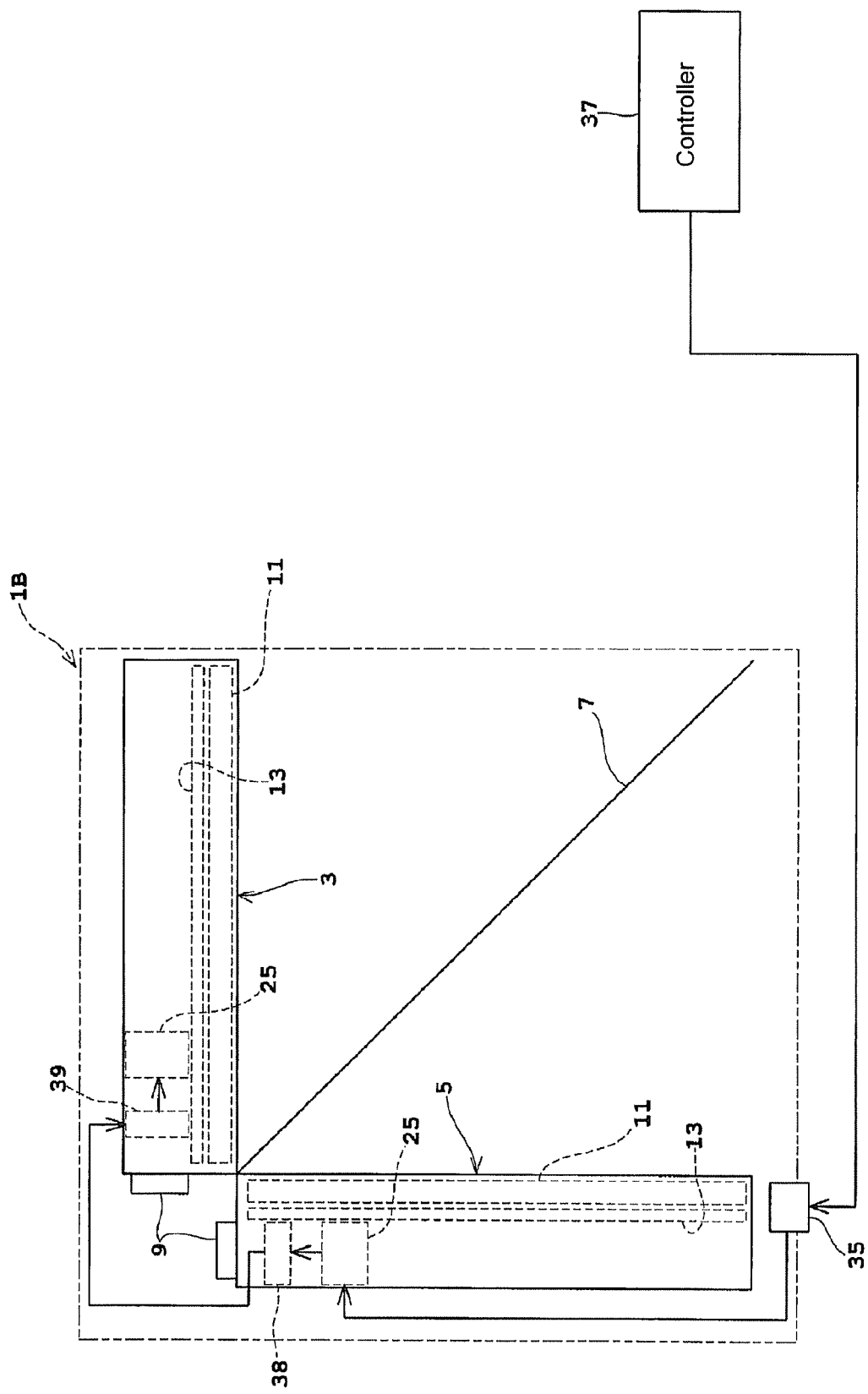
FIG. 6 is a side view illustrating a schematic configuration of a stereo image display device according to the third modification.

In the above embodiment and first modification, it is preferable to employ the following configuration. FIG. 6 is referred to for explaining the present modification. FIG. 6 is a side view illustrating a schematic configuration of stereo image display device according to the third modification.

In the above second modification (the stereo image display device 1A), the same luminance set value is set in parallel to the first image display portion 3 and the second image display portion 5. A stereo image display device 1B according to the third modification is different from the second modification in a configuration, where the luminance set value is written in series.

Specifically, the second image display portion 5 has a receiver 35 and a communication portion 38. Also, the first image display device 3 has a communication portion 39. The receiver 35 receives a luminance set value, which is sent from the controller 37, and which is set to a desired value by the user. The receiver 35 writes the received luminance set value in the user setting storage portion 25 of the second image display portion 5. Also, when the luminance set value of the user setting storage portion 25 of the second image display portion 5 is updated, the communication portion 38 sends the updated luminance set value to the communication portion 39 of the first image display portion 3. The communication portion 39 writes the received luminance set value in the user setting storage portion 25.

The receiver 35, the controller 37, and the communication portions 38, 39 in the above configuration correspond to "a synchronous setting means" of the present invention.

According to the above stereo image display device 1B, when the controller 37 changes the set luminance value of the second image display portion 5 based on the luminance value, which is wanted by the user, the set luminance value of the first image display portion 3 is synchronously changed to the same value. As a result, even when the user changes one of the luminance values, the other one of the luminance values is also set to the same value. As a result, even when the correction related to the above semi-transparent mirror 7 is executed, the luminance balance of the images displayed on both image display portions 3, 5 is maintained.

In the above example, the first image display portion 3 is provided with the communication portion 39, and the second image display portion 5 is provided with the communication portion 38. When the luminance set value of the user setting storage portion 25 of the second image display portion 5 is changed, the same luminance set value is written in the user setting storage portion 25 of the first image display portion 3.

However, alternatively, the set luminance value received by the receiver 35 may be written in the user setting storage portion 25 of the first image display portion 3, and then the same set luminance value may be written in the user setting storage portion 25 of the second image display portion 5 through the communication portion 39 and the communication portion 38.

<Fourth Modification>

Figure 7:
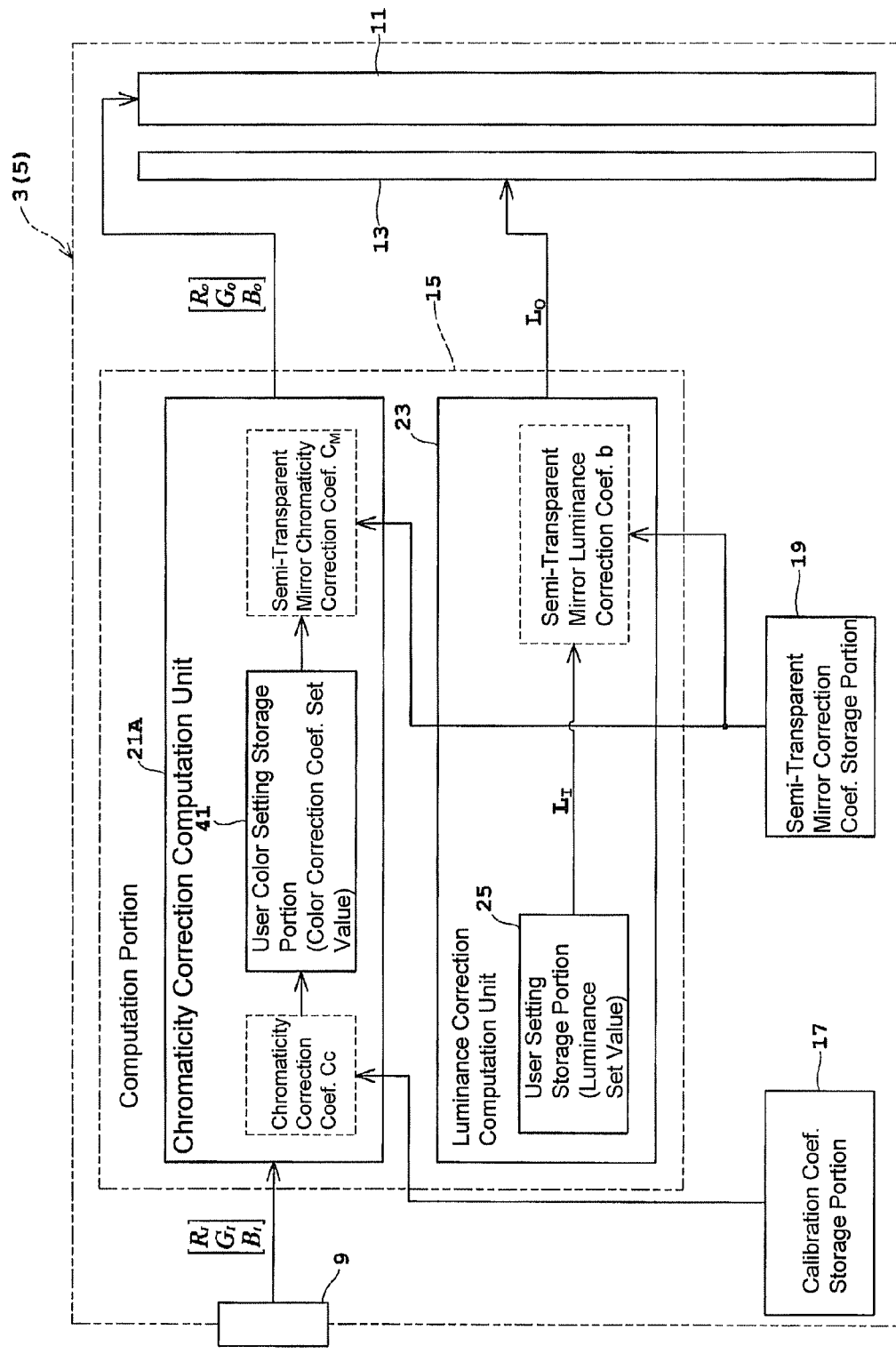
FIG. 7 is a block diagram illustrating a first image display portion according to the fourth modification.

In the above embodiment and first modification, it is preferable to employ the following configuration. FIG. 7 is referred to for explaining the present modification. FIG. 7 is a block diagram illustrating a first image display portion according to the fourth modification.

The first image display portion 3 has a chromaticity correction computation unit 21A. Although not shown, the second image display portion 5 similarly has a color correction computation unit 21A. The chromaticity correction computation unit 21A has a user color setting storage portion 41. The user color setting storage portion 41 stores a user color correction coefficient, which is set by the user. The user color correction coefficient corresponds to, for example, a gain adjustment or a contrast setting. The color correction computation unit 21A executes correction computation based on the following equation (14), which replaces the equation (9), where the user color correction coefficient is denoted by a numeral $C_U$.

$$\begin{bmatrix} R_o \\ G_o \\ B_o \end{bmatrix} = C_M \left( C_U \left( C_C \begin{bmatrix} R_I \\ G_I \\ B_I \end{bmatrix} \right) \right) \quad (14)$$

The above user color setting storage portion 41 corresponds to "a user setting color correction coefficient storage means" of the present invention.

According to the above configuration, it is possible to affect the display color of image with the preference of the user.

Similarly to the above second modification and third modification, it is preferable to be configured that the first image display portion 3 and the second image display portion 5 have the same values when the user color correction coefficient stored in the user color setting storage portion 41 is changed by the user. Due to the above, even when the above correction related to the semi-transparent mirror 7 is executed, the chromaticity balance of the images displayed on both image display portions 3, 5 is maintained.

<Fifth Modification>

Figure 8:
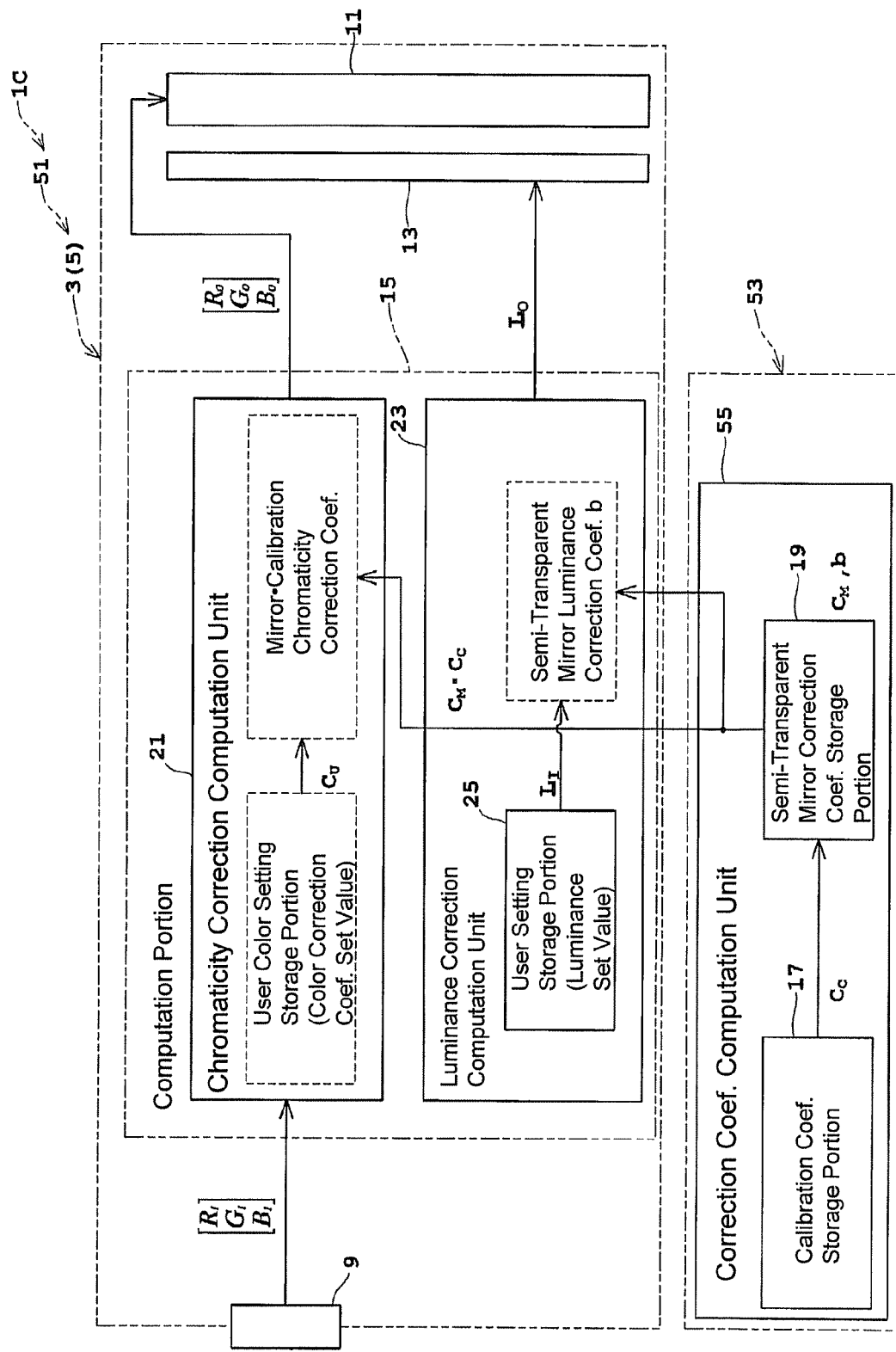
FIG. 8 is a block diagram illustrating a first image display portion and a setting unit according to the fifth modification.

The above embodiment and fourth modification may be alternatively configured in the following manner. FIG. 8 is referred to for explaining the present modification. FIG. 8 is a block diagram illustrating a first image display portion and a setting unit according to the fifth modification.

A stereo image display device 1C has a display device main body 51 and a setting unit 53. The display device main body 51 has a first image display device 3 and a second image display device 5.

The calibration coefficient storage portion 17 and the semi-transparent mirror correction coefficient storage portion 19 are not provided to the display device main body 51, but are provided to the setting unit 53, which is separate from the display device main body 51. The setting unit 53 has a correction coefficient computation unit 55. The correction coefficient computation unit 55 obtains a mirror calibration chromaticity correction coefficient ($C_M \cdot C_C$) based on the chromaticity correction coefficient $C_C$, which is prestored in the calibration coefficient storage portion 17, and based on the semi-transparent mirror chromaticity correction coefficient $C_M$, which is prestored in the semi-transparent mirror correction coefficient storage portion 19. The obtained mirror calibration chromaticity correction coefficient ($C_M \cdot C_C$) is set in the chromaticity correction computation unit 21. Also, the semi-transparent mirror luminance correction coefficient b, which is stored in the semi-transparent mirror correction coefficient storage portion 19, is set in the luminance correction computation unit 23.

The correction coefficient computation unit 55 corresponds to "a computation means" of the present invention, the mirror calibration chromaticity correction coefficient ($C_M \cdot C_C$) corresponds to "mirror calibration correction coefficient" of the present invention.

Due to the above configuration, effects similar to those of the above embodiment are achievable. Furthermore, since various coefficients are stored in the setting unit 53, which is separate from the display device main body 51, it is possible to connect the common setting unit 53 with multiple stereo image display devices 1C, and thereby it is possible to set the same coefficient in each of the multiple display device main bodies 51. As a result, it is possible to easily unify the display states of the multiple stereo image display devices 1C. Also, since it is possible to employ the single setting unit 53 to the multiple display device main bodies 51, it is possible to suppress the cost of the display device main bodies 51.

In the fifth modification, the configurations of the first to fourth modifications may be combined.

<Sixth Modification>

<Configuration Example of Semi-Transparent Mirror>

Figure 9:
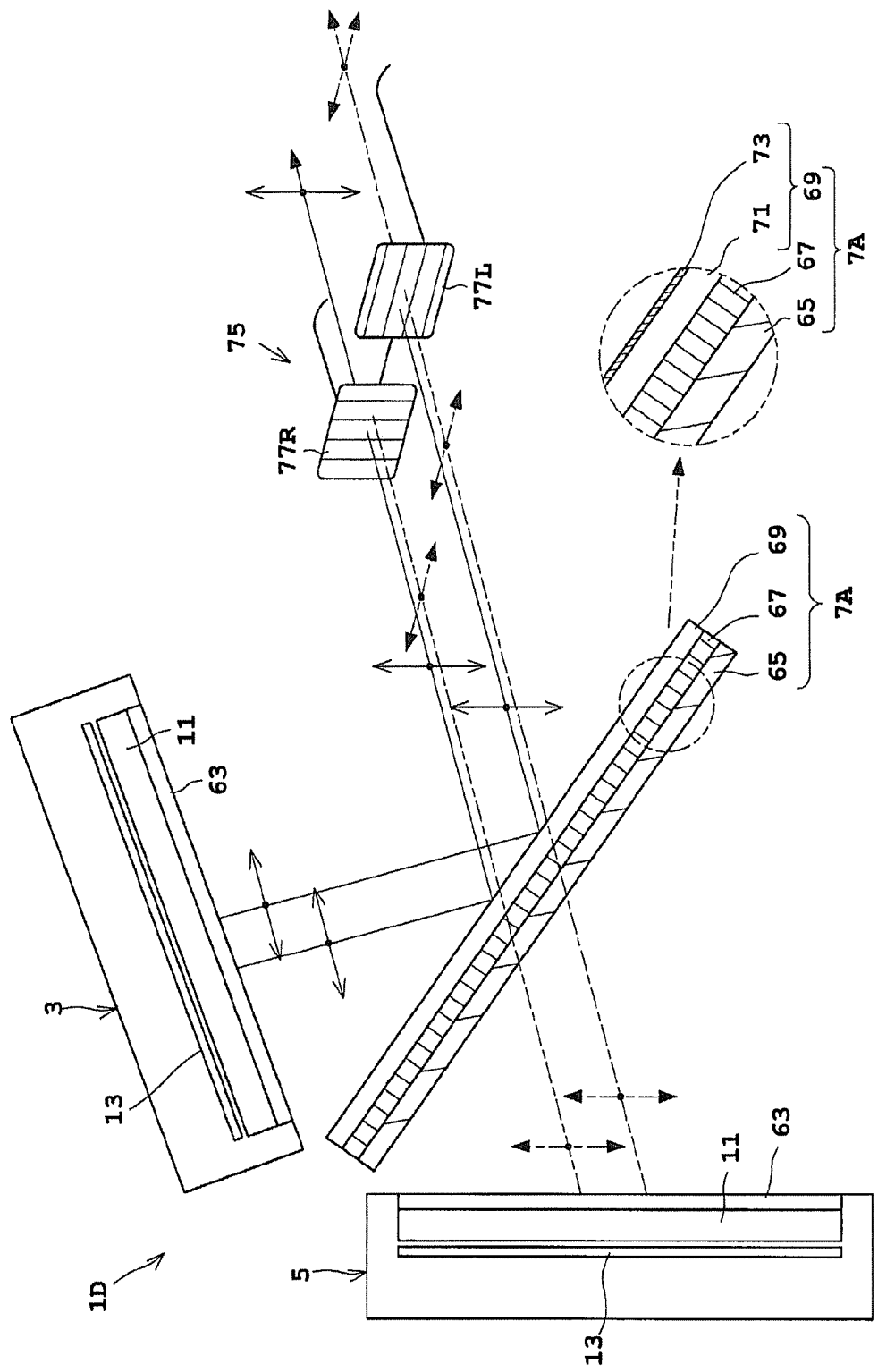
FIG. 9 is a longitudinal sectional view illustrating a preferable configuration of a semi-transparent mirror.

In the above embodiment and the first to fifth modifications, it is preferable to employ the following configuration. FIG. 9 is referred to for explaining the present modification. FIG. 9 is a longitudinal sectional view illustrating a preferable configuration of the semi-transparent mirror.

The above semi-transparent mirror 7 is preferable to have a configuration of a semi-transparent mirror 7A in the following manner. In FIG. 9, under the consideration of the viewability by the observer, an angle defined between the first image display portion 3 and the second image display portion 5, which constitute a stereo image display device 1D, is designed to be about 110 degrees, greater than 90 degrees. The configuration except the semi-transparent mirror 7A is generally similar to the above embodiment. For the convenience of the explanation, it is assumed that the first image display portion 3 and the second image display portion 5 are respectively provided with linearly polarizing plates 63 on their front surfaces, and that the linearly polarizing plates 63 have the same polarizing characteristic. In the present example, each linearly polarizing plate 63 has a polarizing direction that extends in a vertical direction.

The details of the semi-transparent mirror 7A will be described.

The semi-transparent mirror 7A has a half-wave plate 65, a linearly polarizing plate 67, and a semi-transparent mirror portion 69, which are stacked upon one another in the order from the side of the semi-transparent mirror 7A, on which light from the second image display portion 5 is incident. Adherence for the parts may preferably employ an optical adhesive that has a refractive index similar to that of the material of the semi-transparent mirror portion 69. The semi-transparent mirror portion 69 has a transparent layer 71 and a semi-transparent mirror layer 73 as shown in an enlarged partial view in FIG. 9. The transparent layer 71 is made of a material (such as glass or synthetic resin), which is optically transparent. The semi-transparent mirror layer 73 is adhered to the transparent layer 71 through a method such as evaporation.

The half-wave plate 65 corresponds to "polarization rotating layer" of the present invention, and the linearly polarizing plate 67 corresponds to "linearly polarizing layer" of the present invention.

The half-wave plate 65 has function of rotating a polarizing direction of linearly polarized light. For example, the polarizing direction of light, which is emitted from the second image display portion 5, and which is polarized in the vertical direction, is rotated by 90 degrees, to be polarized in a horizontal direction. The linearly polarizing plate 67 has function of suppressing dispersion of the wavelength of light, which may be caused by the birefringence by using the half-wave plate 65. As a result, the transmittance of the light from the second image display portion 5 through the semi-transparent mirror 7A is capable of suppressing a rainbow pattern, which may be caused by birefringence, and the change of the display color. Also, even when light emitted from the first image display portion 3 transmits through the semi-transparent mirror portion 69 without being reflected by the semi-transparent mirror portion 69, it is possible to absorb such light by the linearly polarizing plate 67 that has a different polarizing characteristic. As a result, it is possible to suppress the adverse influence caused by the part of light from the first image display portion 3, which transmits through the semi-transparent mirror portion 69.

The numeral 75 indicates eyeglasses with polarizing plates for the observer. The eyeglasses 75 with polarizing plates has a right-eye linearly polarizing plate 77R and a left-eye linearly polarizing plate 77L. In the example, the right-eye linearly polarizing plate 77R is polarized in a vertical direction, and the left-eye linearly polarizing plate 77L is polarized in a horizontal direction. As a result, when the observer has the eyeglasses 75 with polarizing plates, the observer is capable of solely observing the right-eye image (polarized in the vertical direction) of the first image display portion 3, which is reflected by the semi-transparent mirror 7A, with the right eye. Also, the observer is capable of solely observing the left-eye image (polarized in the horizontal direction) of the second image display portion 5, which transmits through the semi-transparent mirror 7A, with the left eye. As a result, the observer is capable of observing the stereo image.

By employing the above semi-transparent mirror 7A, the images displayed on the first image display portion 3 and the second image display portion 5 are made to have different polarizing directions from each other. As a result, it is not needed to differentiate the linearly polarizing plates 63, which are provided to the first image display portion 3 and the second image display portion 5. Therefore, the first image display portion 3 and the second image display portion 5 are configured to have the linearly polarizing plates 63 having the same structure. As a result, it is possible to reduce the manufacturing cost of the stereo image display device 1D.

The present invention is not limited to the above embodiments, and may be modified in the following manner.

(1) The stereo image display device may be classified into an eyeglasses type and a naked-eye type. However, regardless of the above types, the above embodiment and the first to fifth modifications may be applied to any device that has the first image display portion 3, 3A, the second image display portion 5, 5A, and the semi-transparent mirror 7.

(2) In the above embodiment, the luminance correction and the chromaticity correction are executed. However, it may be configured to execute only the luminance correction by omitting the chromaticity correction because the human vision is more sensitive to the luminance than the color. Due to the above, it is possible to simplify the device, and thereby it is possible to reduce the device cost.

(3) In the above embodiment, the luminance set value, which is set by the user, and which is stored in the user setting storage portion 25, is considered. However, the luminance set value may be omitted alternatively.

(4) In the above embodiment, the calibration coefficient of the calibration coefficient storage portion 17 is considered. However, it is not needed to consider the calibration coefficient when the color correction values or the gamma correction values are identical for the two display portions 3, 5 or when there is no visually uncomfortable feeling.

(5) In the above embodiment, the stereo image display device 1 has an inversed L shape when observed in a side view as shown in FIG. 1. However, the first image display portion 3 may be alternatively placed at a bottom portion to form an L shape. In the above case, since the corner portion is located at the lower position, the semi-transparent mirror 7 is provided obliquely and upwardly toward the viewpoint VP.

(6) In the above embodiment, the first image display portion 3 and the second image display portion 5 are respectively provided with the semi-transparent mirror correction coefficient storage portion 19 and the luminance correction computation unit 23. However, the semi-transparent mirror correction coefficient storage portion 19 and the luminance correction computation unit 23 may be located at different positions as long as they are provided to the stereo image display device 1.

As above, the present invention is suitable to a stereo image display device that makes a stereo image recognizable.

The invention claimed is:

1. A stereo image display device capable of displaying a stereo image based on a binocular parallax comprising:
 a first image display means having:
  a first video output portion configured to display one of a right-eye image and a left-eye image based on a first video signal; and
  a first luminance adjustment portion configured to adjust a luminance of the first video output portion based on a first luminance input signal;
 a second image display means provided to form a corner portion together with the first image display means, the second image display means having:
  a second video output portion configured to display the other one of the right-eye image and the left-eye image based on a second video signal; and
  a second luminance adjustment portion configured to adjust a luminance of the second video output portion based on a second luminance input signal;
 a semi-transparent mirror obliquely provided from the corner portion, the semi-transparent mirror configured to reflect the image, which is displayed on the first image display means, toward an observer, and configured to allow the image, which is displayed on the second image display means, to transmit therethrough toward the observer;
 a semi-transparent mirror luminance correction coefficient storage means for storing a semi-transparent mirror luminance correction coefficient that is based on a reflectance ratio and a transmittance ratio of the semi-transparent mirror; and
 a luminance correcting means for correcting the first and second luminance input signals, which are inputted into the first luminance adjustment portion and the second luminance adjustment portion, based on the semi-transparent mirror luminance correction coefficient, wherein:

the first image display means and the second image display means respectively have calibration sensors, which collect first and second calibration coefficients in a state, where the calibration sensors are respectively brought into tight contact with or are close to the first video output portion and the second video output portion, and the luminance correcting means adjusts the first and second luminance input signals to cancel a luminance difference between the image of the first image display means, which is reflected by the semi-transparent mirror, and the image of the second image display means, which is allowed to transmit through the semi-transparent mirror.

2. A stereo image display device capable of displaying a stereo image based on a binocular parallax comprising:

a first image display means having:
  a first video output portion configured to display one of a right-eye image and a left-eye image based on a first video signal; and
  a first luminance adjustment portion configured to adjust a luminance of the first video output portion based on a first luminance input signal;

a second image display means provided to form a corner portion together with the first image display means, the second image display means having:
  a second video output portion configured to display the other one of the right-eye image and the left-eye image based on a second video signal; and
  a second luminance adjustment portion configured to adjust a luminance of the second video output portion based on a second luminance input signal; and a semi-transparent mirror obliquely provided from the corner portion, the semi-transparent mirror configured to reflect the image, which is displayed on the first image display means, toward an observer, and configured to allow the image, which is displayed on the second image display means, to transmit therethrough toward the observer, wherein:

the first image display means has:
  a semi-transparent mirror reflected luminance correction coefficient storage means for storing a first semi-transparent mirror luminance correction coefficient, which is set based on a reflectance ratio and a transmittance ratio of the semi-transparent mirror in order to cancel a luminance difference; and
  a first luminance correcting means for correcting the first luminance input signal, which is inputted into the first luminance adjustment portion, based on the first semi-transparent mirror luminance correction coefficient; and the second image display means has:
  a semi-transparent mirror transmitted luminance correction coefficient storage means for storing a second semi-transparent mirror luminance correction coefficient, which is set based on the transmittance ratio and the reflectance ratio of the semi-transparent mirror in order to cancel the luminance difference; and
  a second luminance correcting means for correcting the second luminance input signal, which is inputted into the second luminance adjustment portion, based on the second semi-transparent mirror luminance correction coefficient, wherein the first image display means and the second image display means respectively have calibration sensors, which collect first and second calibration coefficients in a state, where the calibration sensors are respectively brought into tight contact with or are close to the first video output portion and the second video output portion.

3. The stereo image display device according to claim 2, wherein:

the first image display means further has a first user setting storage means for storing a first luminance set value, which is set by a user, the first luminance input signal being adjusted based on the first luminance set value; and the second image display means further has a second user setting storage means for storing a second luminance set value, which is set by the user, the second luminance input signal being adjusted based on the second luminance set value.

4. The stereo image display device according to claim 2, wherein:

the first image display means has:
  a semi-transparent mirror reflected chromaticity correction coefficient storage means for storing a first semi-transparent mirror chromaticity correction coefficient used for correcting, based on the reflectance ratio of the semi-transparent mirror, balance of an first RGB value that is unbalanced due to a reflection characteristic of the semi-transparent mirror; and
  a first chromaticity correcting means for correcting the first video signal, which is inputted into the first video output portion, based on the first semi-transparent mirror chromaticity correction coefficient; and the second image display means further has:
  a semi-transparent mirror transmitted chromaticity correction coefficient storage means for storing a second semi-transparent mirror chromaticity correction coefficient used for correcting, based on the transmittance ratio of the semi-transparent mirror, balance of an second RGB value that is unbalanced by a transmittance characteristic of the semi-transparent mirror; and
  a second chromaticity correcting means for correcting the second video signal, which is inputted into the second video output portion, based on the second semi-transparent mirror chromaticity correction coefficient.

5. The stereo image display device according to claim 4, wherein:

the first image display means further has a first calibration coefficient storage means for storing the first calibration coefficient, which is obtained through a first calibration, the first chromaticity correcting means of the first image display means correcting the first video signal, which is inputted into the first video output portion, based on the first calibration coefficient; and the second image display means further has a second calibration coefficient storage means for storing the second calibration coefficient, which is obtained through a second calibration, the second chromaticity correcting means of the second image display means correcting the second video signal, which is inputted into the second video output portion, based on the second calibration coefficient.

6. The stereo image display device according to claim 3, further comprising:

a common value setting means for setting a value set by the user as the first luminance set value of the first user setting storage means of the first image display means and also as the second luminance set value of the second user setting storage means of the second image display means.

7. The stereo image display device according to claim 3, further comprising:
a synchronous setting means for setting, when one of the first and second luminance set values of the first user setting storage means of the first image display means and the second user setting storage means of the second image display means is changed by the user, the other one of the first and second luminance set values to an equivalent value, which is equivalent to the one of the first and second luminance set values.

8. A stereo image display device capable of displaying a stereo image based on a binocular parallax comprising:
a display device main body having:
a first image display means having:
a first video output portion configured to display one of a right-eye image and a left-eye image based on a first video signal; and
a first luminance adjustment portion configured to adjust a luminance of the first video output portion based on a first luminance input signal;
a second image display means provided to form a corner portion together with the first image display means, the second image display means having:
a second video output portion configured to display the other one of the right-eye image and the left-eye image based on a second video signal; and
a second luminance adjustment portion configured to adjust a luminance of the second video output portion based on a second luminance input signal; and
a semi-transparent mirror obliquely provided from the corner portion, the semi-transparent mirror reflecting the image, which is displayed on the first image display means, toward an observer, the semi-transparent mirror allowing the image, which is displayed on the second image display means, to transmit therethrough toward the observer, wherein:
the first image display means has a first luminance correcting means for correcting the first luminance input signal, which is inputted into the first luminance adjustment portion, based on a first semi-transparent mirror luminance correction coefficient that is set based on a reflectance ratio and a transmittance ratio of the semi-transparent mirror in order to cancel a luminance difference; and
the second image display means has a second luminance correcting means for correcting the second luminance input signal, which is inputted into the second luminance adjustment portion, based on a second semi-transparent mirror luminance correction coefficient that is set based on the transmittance ratio and the reflectance ratio of the semi-transparent mirror in order to cancel the luminance difference; and
a setting unit having:
a semi-transparent mirror reflected luminance correction coefficient storage means for storing the first semi-transparent mirror luminance correction coefficient for the first image display means; and
a semi-transparent mirror transmitted luminance correction coefficient storage means for storing the second semi-transparent mirror luminance correction coefficient for the second image display means, wherein:
the first image display means and the second image display means respectively have calibration sensors, which collect first and second calibration coefficients in a state, where the calibration sensors are respectively brought into tight contact with or are close to the first video output portion and the second video output portion, and
the setting unit sets the first semi-transparent mirror luminance correction coefficient of the semi-transparent mirror reflected luminance correction coefficient storage means and the second semi-transparent mirror luminance correction coefficient of the semi-transparent mirror transmitted luminance correction coefficient storage means in the display device main body.

9. The stereo image display device according to claim 8, wherein:
in the display device main body,
the first image display means further has a first user setting storage means for storing a first luminance set value, which is set by a user, the first luminance input signal being adjusted based on the first luminance set value; and
the second image display means further has a second user setting storage means for storing a second luminance set value, which is set by the user, the second luminance input signal being adjusted based on the second luminance set value.

10. The stereo image display device according to claim 8, wherein:
in the display device main body,
the first image display means has a first chromaticity correcting means for correcting the first video signal, which is inputted into the first video output portion, based on a first semi-transparent mirror chromaticity correction coefficient used for correcting, based on a reflectance ratio of the semi-transparent mirror, and balance of a first RGB value that is unbalanced due to a reflection characteristic of the semi-transparent mirror; and
the second image display means has a second chromaticity correcting means for correcting the second video signal, which is inputted into the second video output portion, based on a second semi-transparent mirror chromaticity correction coefficient used for correcting, based on a transmittance ratio of the semi-transparent mirror, and balance of a second RGB value that is unbalanced due to a transmittance characteristic of the semi-transparent mirror;
the setting unit has:
a semi-transparent mirror reflected chromaticity correction coefficient storage means for prestoring the first semi-transparent mirror chromaticity correction coefficient of the first image display device; and
a semi-transparent mirror transmitted chromaticity correction coefficient storage means for prestoring the second semi-transparent mirror chromaticity correction coefficient of the second image display device; and
the setting unit sets the first semi-transparent mirror chromaticity correction coefficient of the semi-transparent mirror reflected chromaticity correction coefficient storage means and the second semi-transparent mirror chromaticity correction coefficient of the semi-transparent mirror transmitted chromaticity correction coefficient storage means in the display device main body.

11. The stereo image display device according to claim 10, wherein:
the setting unit has:
a first calibration coefficient storage means for storing the first calibration coefficient which is obtained through a first calibration of the first image display means;

a second calibration coefficient storage means for storing the second calibration coefficient which is obtained through a second calibration of the second image display means; and a computation means for computing a first mirror calibration correction coefficient based on the first calibration coefficient of the first image display means and the first semi-transparent mirror chromaticity correction coefficient of the semi-transparent mirror reflected chromaticity correction coefficient storage means, and for computing a second mirror calibration correction coefficient based on the second calibration coefficient of the second image display means and the second semi-transparent mirror chromaticity correction coefficient of the semi-transparent mirror transmitted chromaticity correction coefficient storage means;

the setting unit sets the first mirror calibration correction coefficient of the first image display means and the second mirror calibration correction coefficient of the second image display means in the display device main body;

in the display device main body, the first chromaticity correcting means of the first image display means corrects the first video signal, which is inputted into the first video output portion, based on the first mirror calibration correction coefficient of the first image display means; and the second chromaticity correcting means of the second image display means corrects the second video signal, which is inputted into the second video output portion, based on the second mirror calibration correction coefficient of the second image display means.

12. The stereo image display device according to claim 9, further comprising:

a common value setting means for setting a value set by the user as the first luminance set value of the first user setting storage means of the first image display means in the display device main body and also as the second luminance set value of the second user setting storage means of the second image display means in the display device main body.

13. The stereo image display device according to claim 9, further comprising:

a synchronous setting means for setting, when one of the first and second luminance set values of the first user setting storage means of the first image display means in the display device main body and the second user setting storage means of the second image display means in the display device main body is changed by the user, the other one of the first and second luminance set values to an equivalent value, which is equivalent to the one of the first and second luminance set values.

* * * * *